Nov. 24, 1964   D. CLEJAN   3,158,106
FREIGHT TRANSPORTATION SYSTEMS
Filed May 18, 1959   11 Sheets-Sheet 2
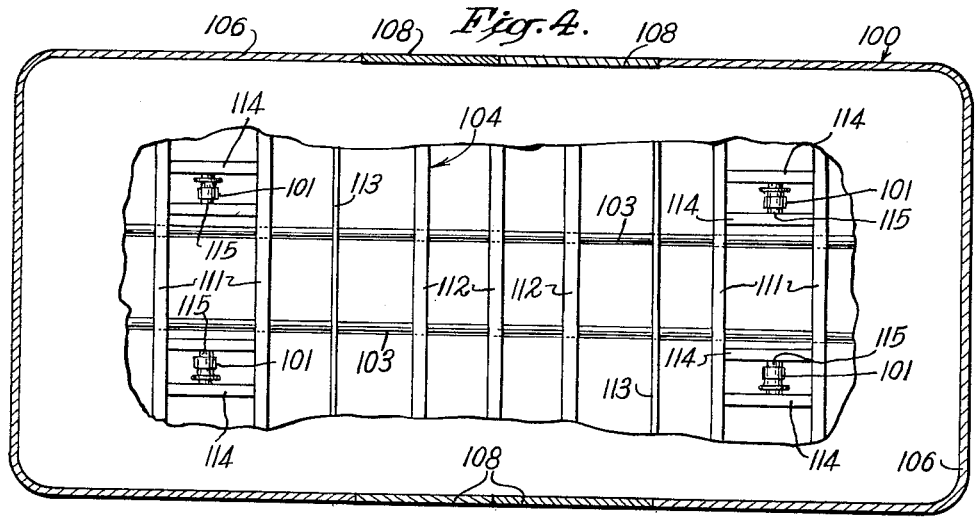
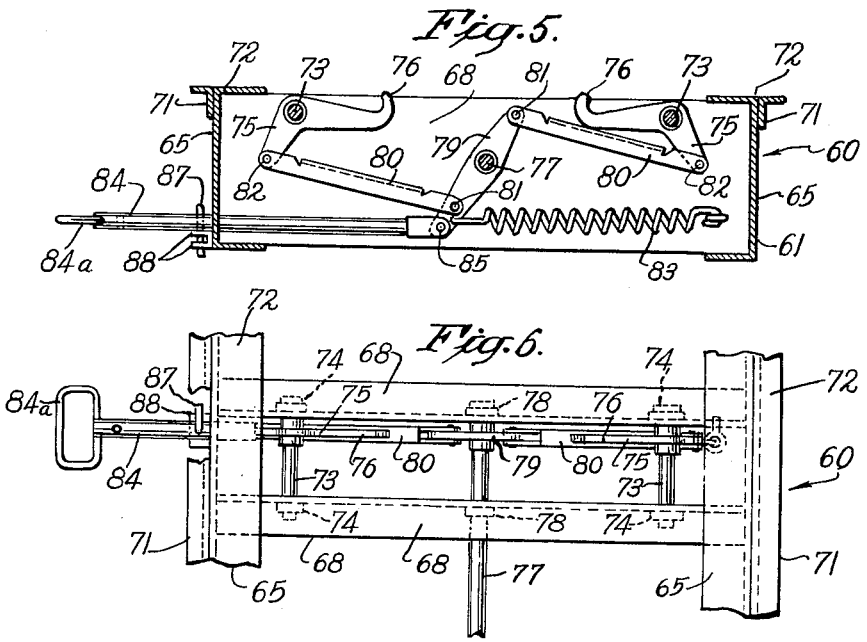
INVENTOR.
DEODAT CLEJAN
BY
ATTORNEYS

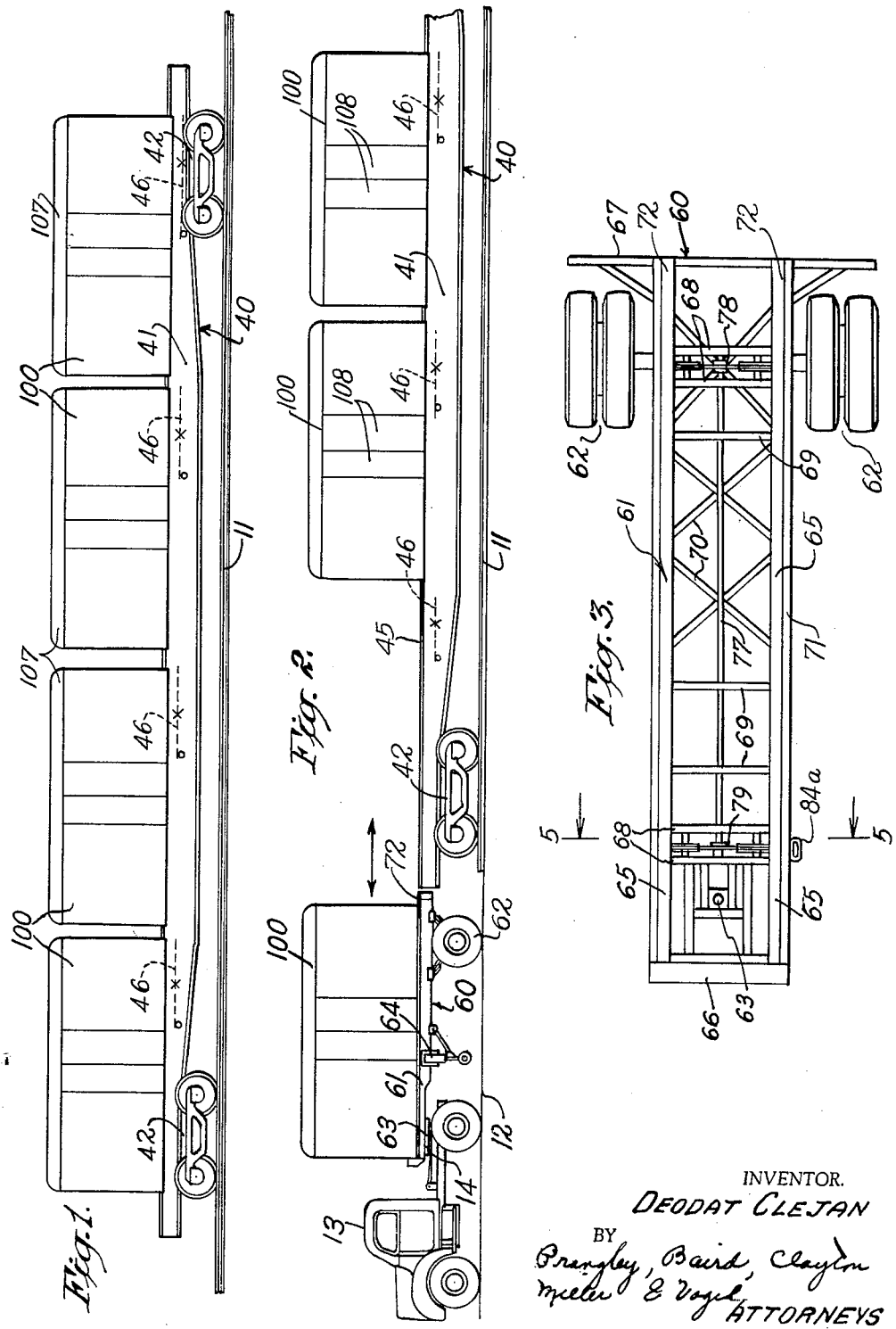

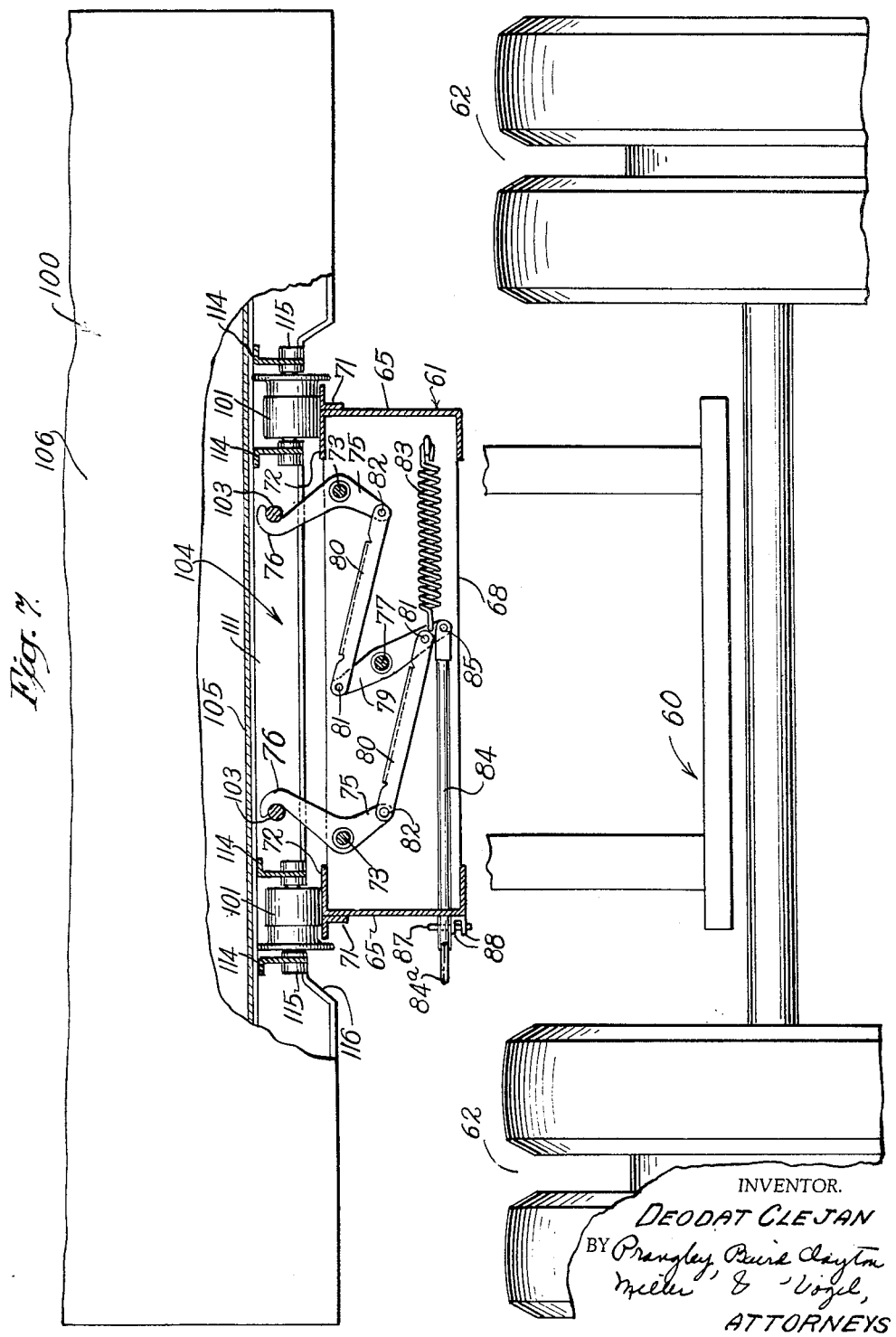

Nov. 24, 1964   D. CLEJAN   3,158,106
FREIGHT TRANSPORTATION SYSTEMS
Filed May 18, 1959   11 Sheets-Sheet 4
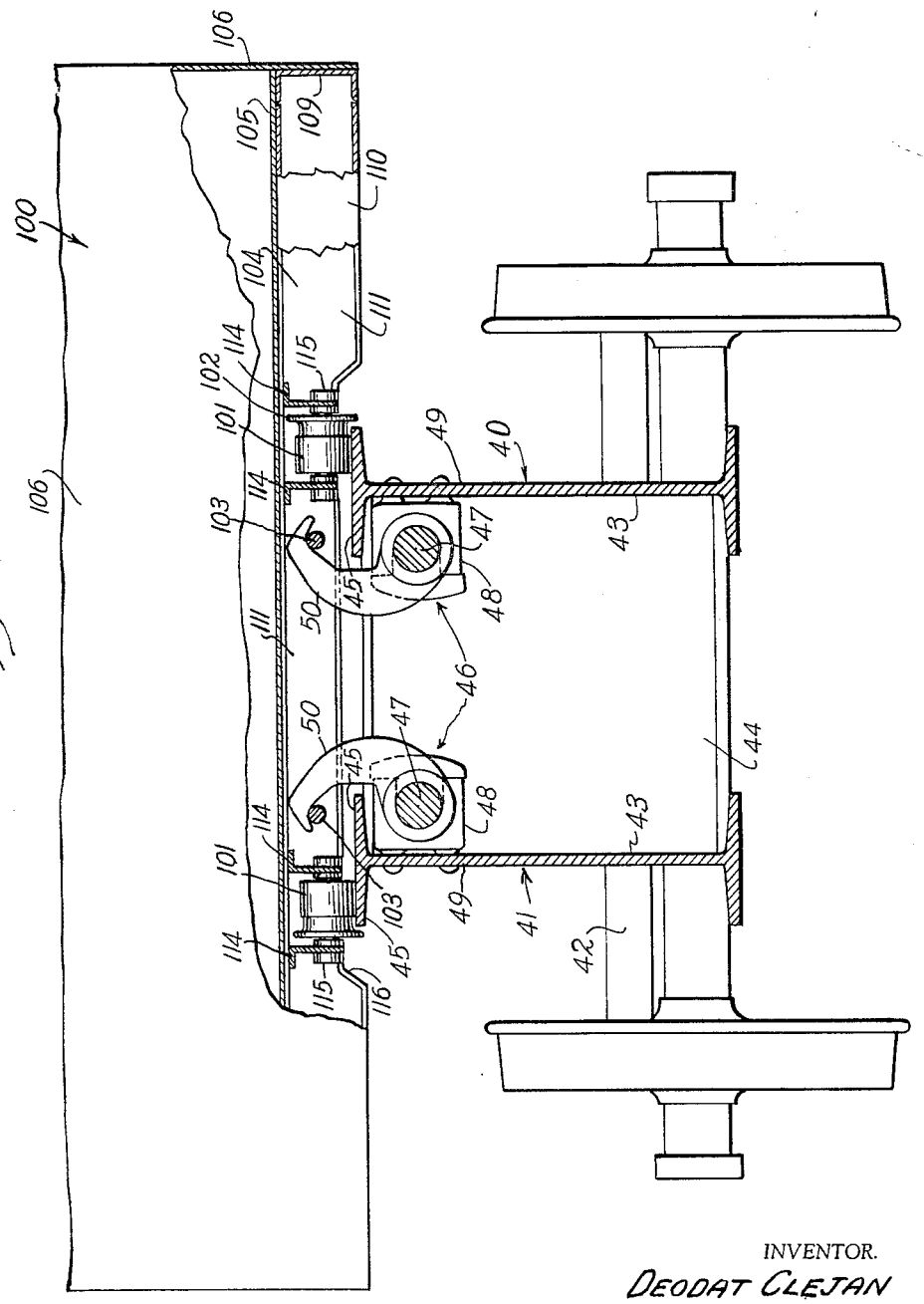
INVENTOR.
DEODAT CLEJAN
BY
Prangley, Baird, Clayton, Miller & Vogel,
ATTORNEYS

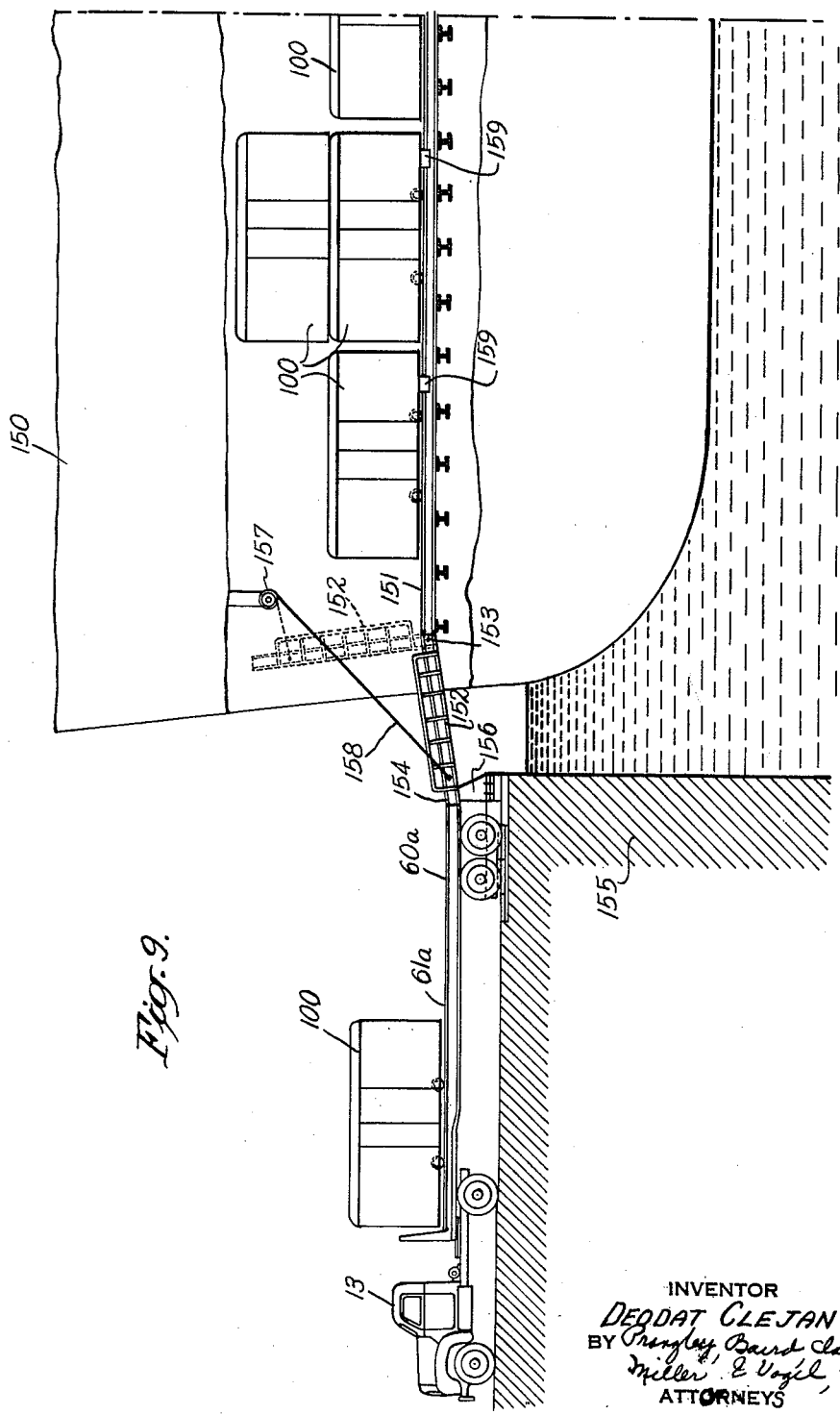

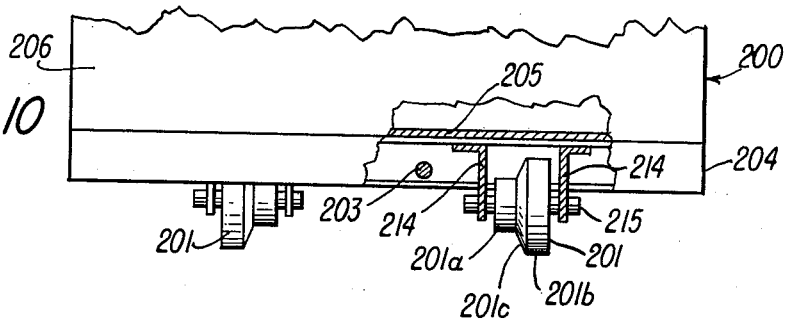
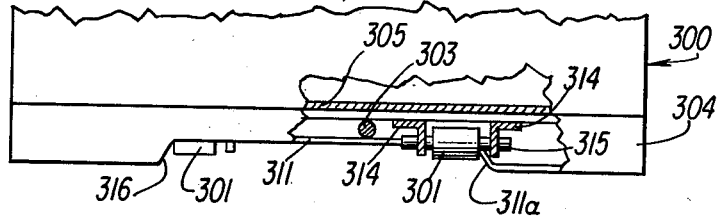
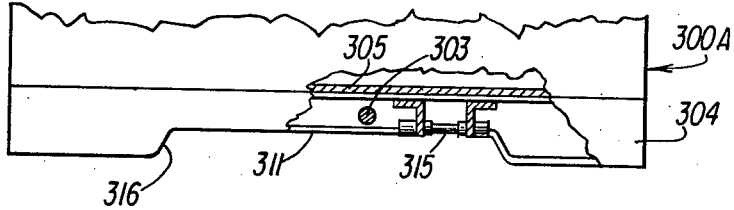
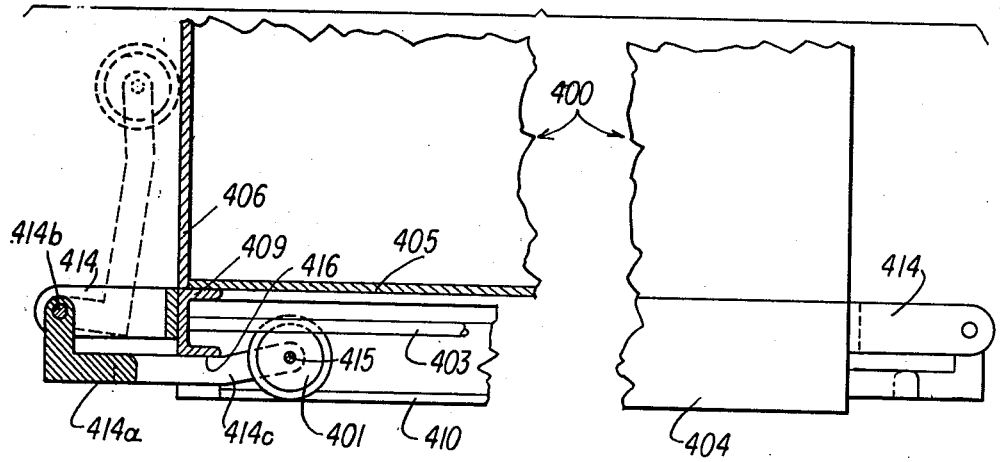
INVENTOR.
DEODAT CLEJAN

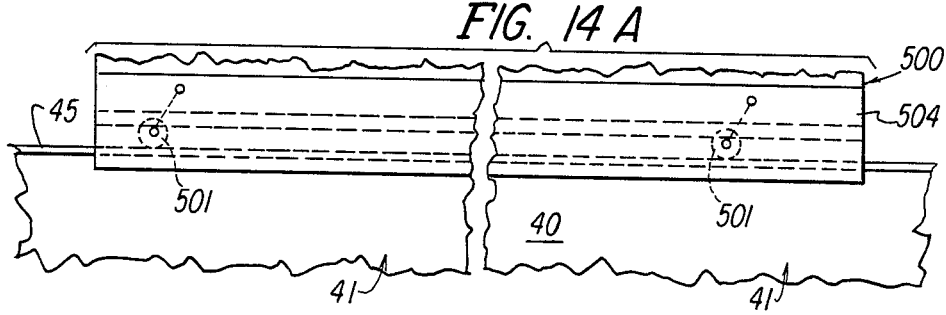
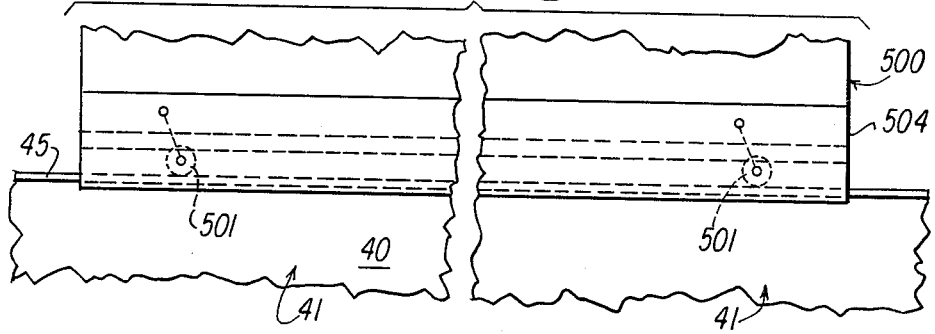
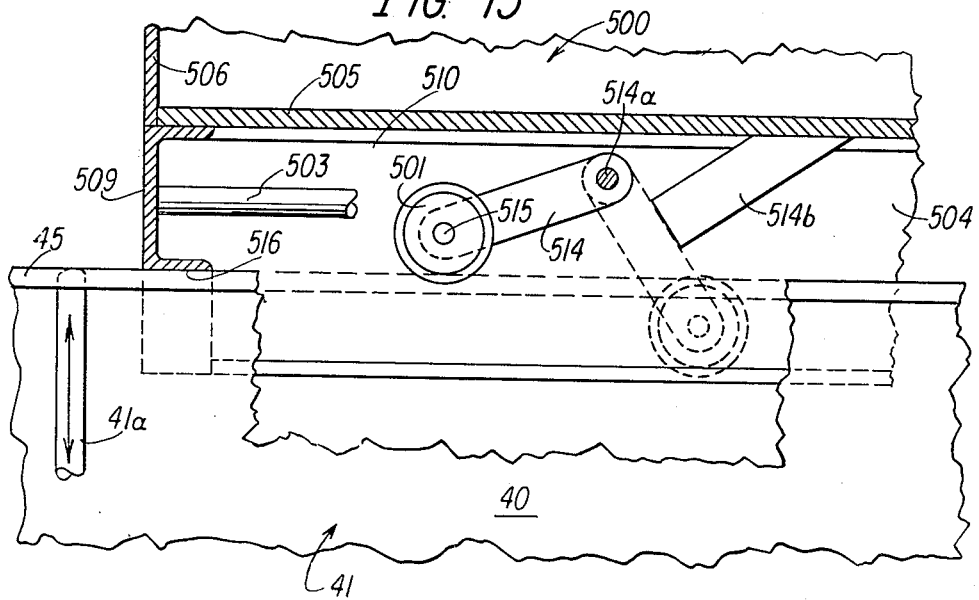

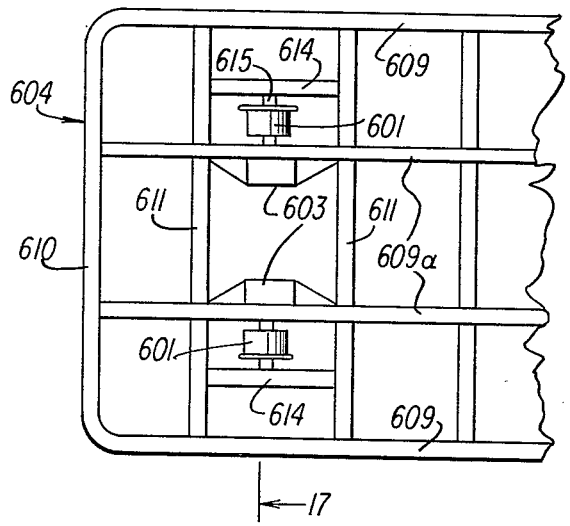
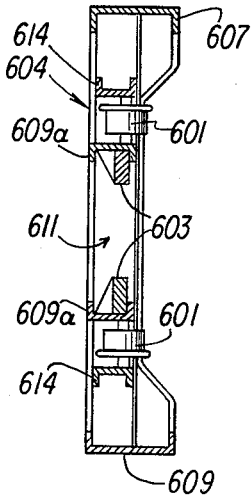
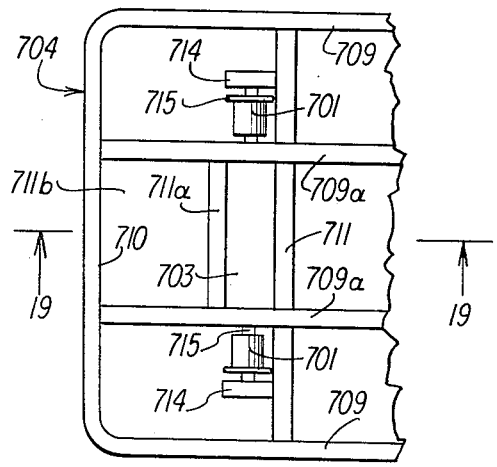
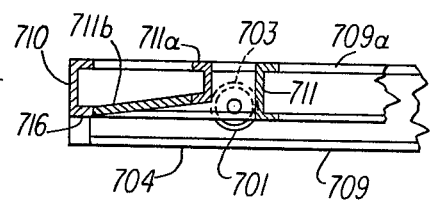

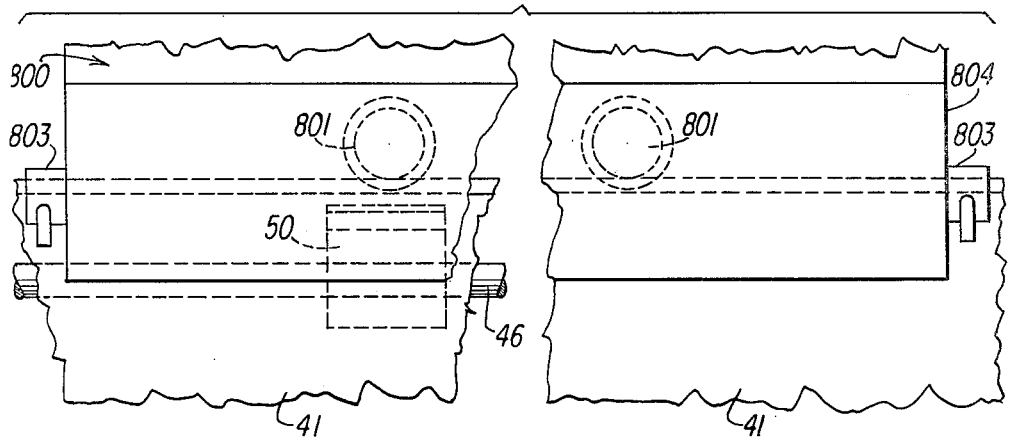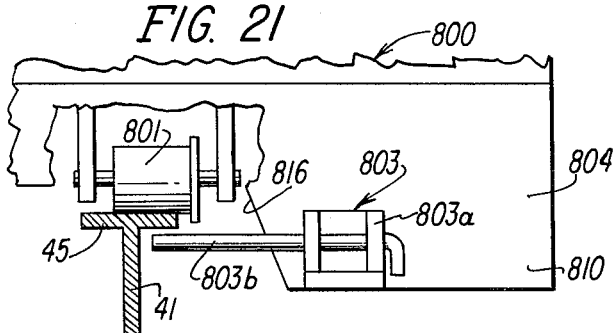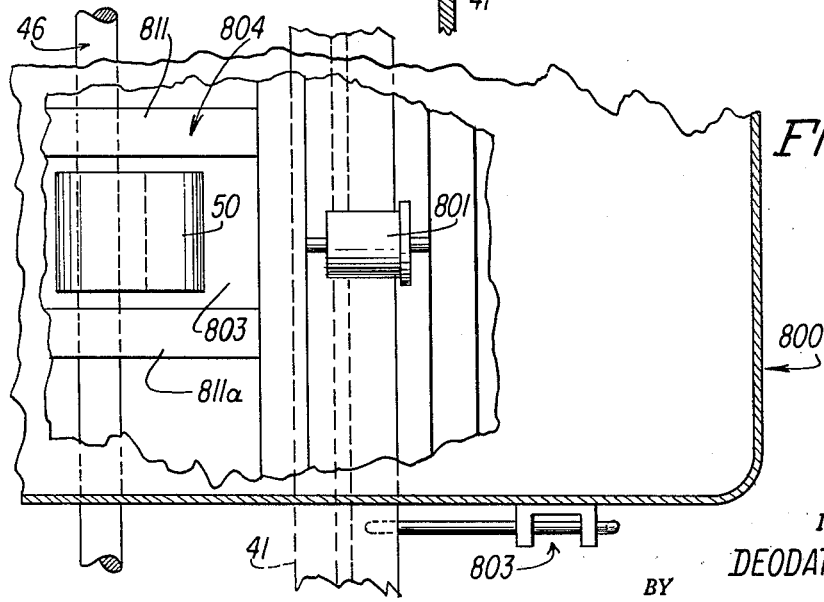

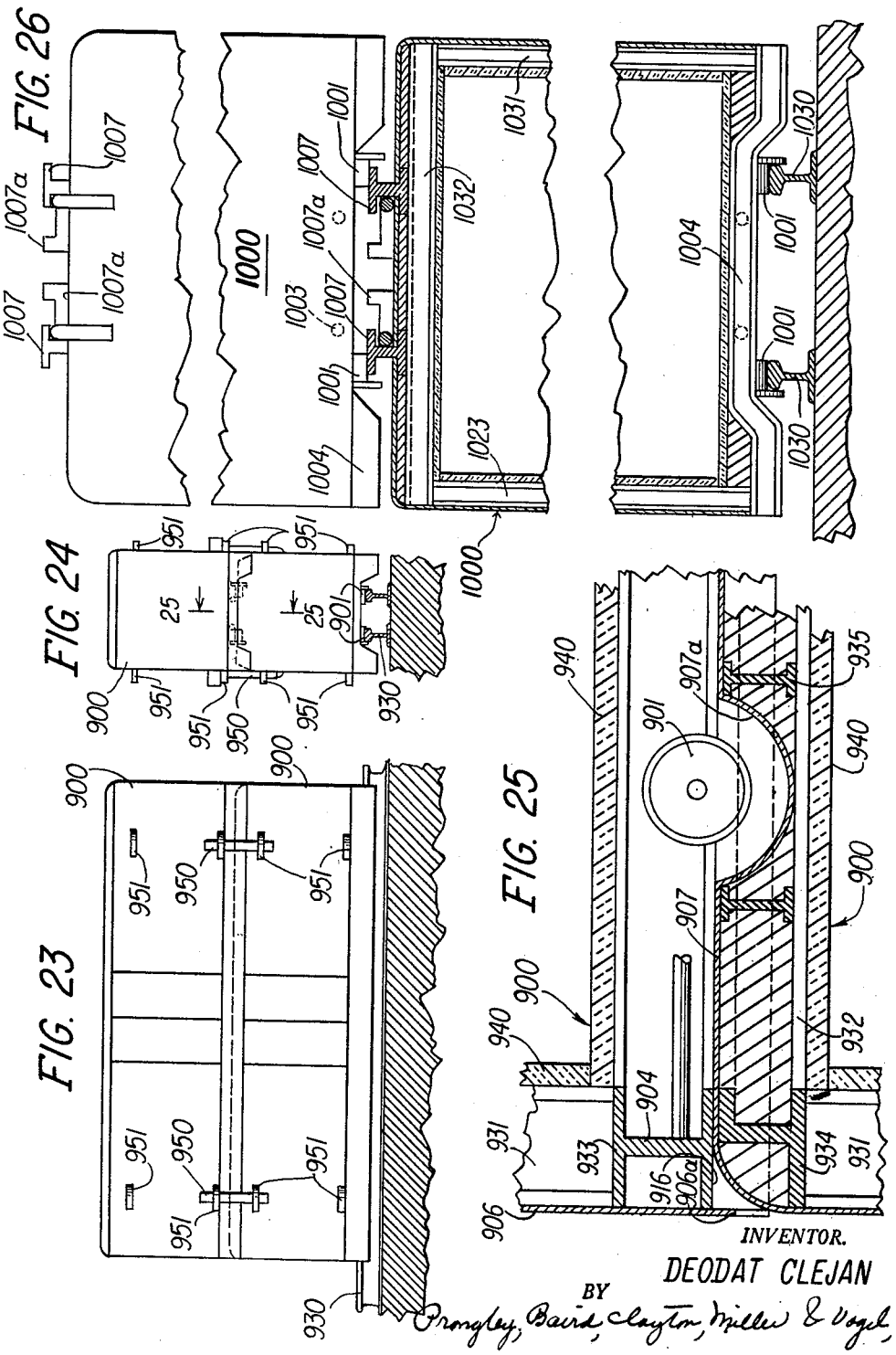

Nov. 24, 1964   D. CLEJAN   3,158,106
FREIGHT TRANSPORTATION SYSTEMS
Filed May 18, 1959   11 Sheets-Sheet 11
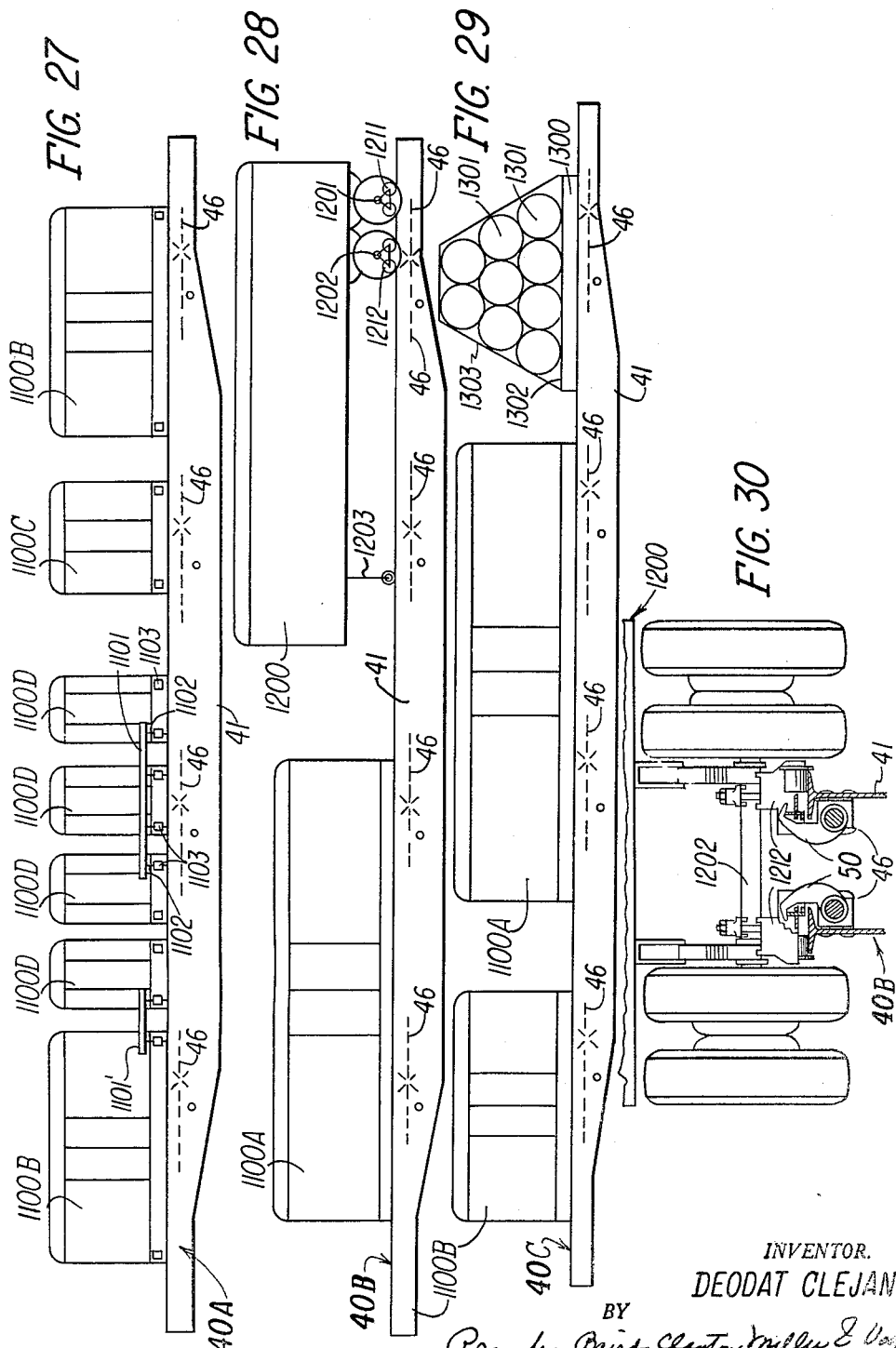
INVENTOR.
DEODAT CLEJAN
BY
Prangley, Baird, Clayton, Miller & Vogel,
Attorneys.

United States Patent Office 3,158,106
Patented Nov. 24, 1964

3,158,106
FREIGHT TRANSPORTATION SYSTEMS
Deodat Clejan, Chicago, Ill., assignor, by mesne assignments, to General American Transportation Corporation, Chicago, Ill., a New York corporation
Filed May 18, 1959, Ser. No. 813,957
4 Claims. (Cl. 105—366)

The present invention relates to freight transportation systems and to freight transportation units employed in such systems. This application is a continuation-in-part of the copending application of Deodat Clejan, Serial No. 734,755, filed May 12, 1958, now abandoned.

It is a general object of the present invention to provide an improved freight transportation system of the rail-road-ship type comprising a freight carrier that may be readily mounted upon any one of a number of vehicles (railway cars, highway trailers, ships, etc.) for transportation thereon, and that may be readily transferred from one to another of such vehicles; whereby a lading in the freight carrier may be shipped undisturbed from its origin to its destination, without reference to the number or the types of vehicles that may be involved en route, and without consideration of this circumstance by either the consignor or the consignee.

Another object of the invention is to provide an improved transportation system including a railway vehicle and a highway vehicle and a freight carrier, wherein the freight carrier may be selectively supported upon these vehicles and may be selectively held and released with respect to the frame of the supporting vehicle in a simple and ready manner and may be readily transferred from one to the other of the vehicles.

Another object of the invention is to provide an improved transportation system including a highway vehicle and a freight carrier, wherein the frame of the highway vehicle and the base of the freight carrier are so constructed and arranged that the base may be detachably mounted upon the frame to accommodate ready selective placement and removal of the freight carrier with respect to the highway vehicle.

A further object of the invention is to provide a highway vehicle including a supporting frame of improved construction and arrangement accommodating the detachable mounting thereupon of a cooperating removable freight carrier.

Another object of the invention is to provide an improved transportation system including a railway vehicle and a freight carrier, wherein the frame of the railway vehicle and the base of the freight carrier are so constructed and arranged that the base may be detachably mounted upon the frame to accommodate ready selective placement and removal of the freight carrier with respect to the railway vehicle.

Further features of the invention pertain to the particular arrangement of the elements of the transportation system, whereby the above-outlined and additional operating features thereof are attained.

The invention, both as to its organization and method of operation, together with further objects and advantages thereof, will best be understood by reference to the following specification taken in connection with the accompanying drawings, in which:

FIGURE 1 is a side elevational view of a freight transportation system embodying the present invention and including a railway car carrying four freight carriers;

FIG. 2 is a fragmentary side elevational view of the freight transportation system including a highway trailer carrying one of the freight carriers and a railway car carrying two of the freight carriers and indicating the manner in which one of the freight carriers may be transferred in either direction between the highway trailer and the adjacent end of the railway car;

FIG. 3 is an enlarged plan view of the frame of the highway trailer shown in FIG. 2 and illustrating the same as being of the semi-trailer type;

FIG. 4 is an enlarged plan view, partly broken away, of one of the freight carriers shown in FIGS. 1 and 2 and illustrating the construction of the base thereof, including the depending rollers carried thereby;

FIG. 5 is a further enlarged lateral sectional view of the frame of the highway semi-trailer, taken in the direction of the arrows along the line 5—5 of FIG. 3;

FIG. 6 is a further enlarged fragmentary plan view of the section of the frame of the highway semi-trailer, taken adjacent to the lateral sectional view of FIG. 5;

FIG. 7 is a further enlarged rear end view, partly broken away, of the highway semi-trailer and the freight carrier mounted thereon of FIG. 2, illustrating the arrangement for securing the base of the freight carrier to the frame of the highway semi-trailer;

FIG. 8 is a further enlarged lateral sectional view of the railway car and the freight carrier mounted thereon of FIG. 2, illustrating the arrangement for securing the base of the freight carrier to the frame of the railway car;

FIG. 9 is a fragmentary side elevational view of the freight transportation system, including a modified form of the highway semi-trailer arranged to carry two of the freight carriers and a ship arranged to carry in the hold thereof a great number of the freight carriers, and indicating the manner in which one of the freight carriers may be transferred in either direction between the highway semi-trailer and the adjacent end of the hold of the ship;

FIG. 10 is a further enlarged fragmentary end view, partly broken away, of the freight carrier, illustrating a modified arrangement of the rollers carried by the base thereof;

FIG. 11 is a further enlarged fragmentary end view, partly broken away, of the freight carrier, similar to FIG. 10, illustrating another modified arrangement of the rollers carried by the base thereof;

FIG. 12 is a further enlarged fragmentary end view, partly broken away, of the freight carrier, similar to FIG. 11, illustrating the arrangement of the base thereof in the case where the rollers are not installed thereon;

FIG. 13 is a further enlarged fragmentary side elevational view, partly broken away, of the freight carrier, illustrating a further modified arrangement of the rollers carried by the base thereof;

FIGS. 14a and 14b are further enlarged companion fragmentary side elevational views of the freight carrier, illustrating still another modified arrangement of the rollers carried by the base thereof; (in FIGS. 14a and 14b the rollers mentioned being respectively shown in their inactive and active positions);

FIG. 15 is a still further enlarged fragmentary side elevational view, partly broken away, of the freight carrier shown in FIGS. 14a and 14b and illustrating in greater detail the mounting arrangement of the rollers mentioned;

FIG. 16 is an enlarged fragmentary plan view of the base of the freight carrier, illustrating modified structure that may be incorporated therein for securing the same in place upon the cooperating railway car;

FIG. 17 is an enlarged lateral sectional view of the base, taken in the direction of the arrows along the line 17—17 in FIG. 16;

FIG. 18 is an enlarged fragmentary plan view of the base of the freight carrier, illustrating additional structure that may be incorporated therein for effecting automatic setting of cooperating securing hooks incorporated in the frame of the cooperating railway car;

FIG. 19 is an enlarged fragmentary longitudinal sectional view of the base, taken in the direction of the arrows along the line 19—19 in FIG. 18;

FIG. 20 is a further enlarged fragmentary side elevational view of the freight carrier, illustrating a modified arrangement for securing the same in place upon the frame of the cooperating railway car;

FIG. 21 is a further enlarged fragmentary lateral sectional view of the freight carrier shown in FIG. 20, further illustrating the arrangement for securing the same in place upon the frame of the cooperating railway car;

FIG. 22 is a further enlarged fragmentary plan view, partly broken away, of the freight carrier shown in FIGS. 20 and 21, further illustrating the arrangement for securing the same in place upon the frame of the cooperating railway car;

FIG. 23 is a reduced side elevational view of two of the freight carriers of modified construction and incorporating special structure accommodating stacking thereof;

FIG. 24 is a reduced end elevational view of the two stacked freight carriers, as shown in FIG. 23;

FIG. 25 is a greatly enlarged fragmentary longitudinal sectional view of the junction between the two stacked freight carriers, taken in the direction of the arrows along the line 25—25 in FIG. 24;

FIG. 26 is a fragmentary end elevational view, partly broken away and partly in section, of two of the freight carriers of modified construction and also incorporating special structure accommodating stacking thereof;

FIG. 27 is a side elevational view of the freight transportation system, similar to FIG. 1, and illustrating the railway car carrying a number of the freight carriers of different sizes;

FIG. 28 is a side elevational view of the freight transportation system, similar to FIG. 27, and illustrating the railway car carrying two freight carriers, one in the form of a freight container and the other in the form of a highway semi-trailer;

FIG. 29 is a side elevational view of the freight transportation system, similar to FIGS. 27 and 28, and illustrating the railway car carrying two of the freight carriers in the form of freight containers of different sizes, and another of the freight carriers in the form of a pallet; and FIG. 30 is an enlarged fragmentary end elevational view of the upper portion of the frame of the railway car and the lower portion of the frame of the highway semi-trailer, as shown in FIG. 28, and illustrating the arrangement for securing the highway semi-trailer in place in its mounted position upon the frame of the railway car.

Referring now to FIGS. 1 and 2 of the drawings, the freight transportation system there illustrated, and embodying the features of the present invention, is of the general character of that disclosed in the copending application of Etienne de Grandpre, Serial No. 747,724, filed July 10, 1958, now Patent No. 3,033,129, and of that disclosed in the copending application of Etienne de Grandpre, Serial No, 747,779, filed July 10, 1958, now Patent No. 2,949,865, granted August 23, 1960; and this system essentially comprises a railway vehicle or car 40, a highway vehicle in the form of a semi-trailer 60 and one or more freight carriers or containers 100. Preferably, the railway car 40 is of the general construction of that disclosed in the copending application of Deodat Clejan, Serial No. 593,848, filed June 26, 1956, now Patent No. 2,955,492, granted July 12, 1960, and is, of course, adapted for travel over a conventional railway track, indicated at 11. The highway semi-trailer 60 is, of course, adapted for travel over a conventional highway, indicated at 12; and the highway semi-trailer 60 may be drawn along the highway 12 by a conventional highway tractor 13 provided with the usual fifth-wheel mechanism, indicated at 14. The freight containers 100 are arranged for transfer between the frame of the railway car 40 and the frame of the highway semi-trailer 60, as explained more fully hereinafter; and in the arrangement illustrated, the frame of the railway car 40 is adapted to receive and to support four of the freight containers 100, while the frame of the highway semi-trailer 60 is adapted to receive and to support a single one of the freight containers 100.

Referring now to FIGS. 1, 2 and 8, the railway car 40 is of skeleton construction, comprising a longitudinally extending frame 41 in the form of a center sill that is carried at the opposite ends thereof by a pair of four-wheeled trucks 42, cooperating with the rails of the associated railway track 11; and ordinarily the wheels carried by the trucks 42 and the railway track 11 are of standard gauge. As illustrated, the center sill 41 essentially comprises a pair of longitudinally extending and laterally spaced-apart I-beams 43 that are suitably tied together by a number of laterally extending and longitudinally spaced-apart cross members 44, each of which may comprise a short I-beam, as illustrated in FIG. 8. Of course, the opposite ends of the center sill 41 are provided with the usual laterally extending body bolsters, not shown, that are pivotally connected to the usual truck bolsters, not shown, carried by the trucks 42 by center pins, not shown, so as to accommodate articulation of the trucks 42 with respect to the opposite ends of the center sill 41. The center sill 41 possesses the required rigidity for supporting the freight containers 100; and the usual car couplers, not shown, are mounted in the opposite ends of the center sill 41.

In the construction, the longitudinally extending center sill 41, consisting essentially of the two I-beams 43, and interconnecting the trucks 42, is substantially narrower than the gauge of the railway track 11, so that the sides of the center sill 41 are disposed well inwardly with respect to the adjacent sides of the trucks 42. Also, the upper flanges 45 of the I-beams 43 cooperate to provide the rails of a narrow-gauge auxiliary track, provided on the top of the center sill 41; which auxiliary track, defined by the rails 45, is of a gauge essentially narrower than the standard gauge of the railway track 11.

Before proceeding with further description of the railway car 40, it is first noted that each of the freight containers 100 comprises a rigid underframe that carries two longitudinally spaced-apart pairs of laterally spaced-apart low rollers 101, as will be understood by reference to FIGS. 4 and 8. More particularly, each of the rollers 101 is provided with a flange 102 that is disposed adjacent to the outer end thereof; whereby each pair of laterally spaced-apart rollers is inwardly facing and of the narrow gauge of the auxiliary track provided on the top of the center sill 41 by the flanges 45 of the I-beams 43, as clearly illustrated in FIG. 8. Accordingly, the freight container 100 is supported upon the top of the center sill 41 by the four rollers 101 and may be readily rolled longitudinally along the top of the center sill 41 upon the rollers 101. The longitudinal rolling movement of the container 100 along the top of the center sill 41 is guided by the two pairs of inwardly facing flanged rollers 101, the flanges 102 cooperating with the adjacent sides of the outwardly directed portions of the flanges 45 for the guide purpose, in an obvious manner. Also in each of the freight containers 100, the rigid underframe comprises a pair of longitudinally extending and laterally spaced-apart tie-down bars 103, as shown in FIGS. 4 and 8, that are employed for a purpose more fully explained hereinafter.

Returning now to the construction of the railway car 40, the center sill 41 also carries four longitudinally spaced-apart tie-down shock-absorber mechanisms 46, as indicated in FIG. 1. Each of the mechanisms 46 comprises, as best shown in FIG. 8, two longitudinally extending and laterally spaced apart shafts 47 respectively mounted upon suitable brackets 48 respectively secured to the upper portions of the webs 49 of the I-beams 41; whereby the shafts 47 are disposed within the hollow center sill 41 adjacent to the upper portions of the webs 49 and immediately below the inwardly directed portions of the flanges 45 of the I-beams 43. Each of the shafts 47 is mounted for both rotary movement and longitudinal sliding movement in the associated mounting brackets 48; and each of the shafts 47 carries one or more hooks 50 rigidly secured thereto and movable therewith. Each of the mechanisms 46 also comprises manually operable means, not shown, for simultaneously rotating the shafts 47 in opposite directions with respect to each other; whereby the shafts 47 may be rotated away from each other in order to move the hooks 50 out of the hollow center sill 41 and into operated positions disposed above the flanges 45 and engaging the tie-down bars 103 carried by the underframe of the associated freight container 100, as illustrated in FIG. 8; and whereby the shafts 47 may be rotated toward each other in order to move the hooks 50 back into the hollow center sill 41 and thus into retracted positions, disengaging the cooperating tie-down bars 103 carried by the underframe of the associated freight container 100.

The hooks 50 in their operated positions, as illustrated in FIG. 8, secure the associated freight container 100 to the mechanism 46; which mechanism 46 also incorporates shock absorber equipment, not shown; whereby the freight container 100, while secured to the associated mechanism 46, is capable of limited longitudinal rolling movements along the auxiliary track provided by the flanges 45 upon the top of the center sill 41; which limited longitudinal rolling movements are resiliently damped by the shock absorber equipment incorporated in the mechanism 46, thereby to prevent the transmission of severe longitudinal shocks between the center sill 41 of the railway car 40 and the underframe of the cooperating freight container 100.

Of course, when the mechanism 46 is operated to move the hooks 50 into their retracted positions, releasing the underframe of the associated freight container 100, the freight container 100 may be moved along the auxiliary track provided on the top of the center sill 41 of the railway car 40 without interference with the hooks 50, since the hooks 50 in their retracted positions are disposed within the hollow center sill 41. Thus, it will be understood that when the mechanism 46 is operated to move the hooks 50 into their retracted positions, the freight container 100 may be readily rolled along the auxiliary track provided on the top of the center sill 41 for the loading and unloading purpose, each of the freight containers 100 rolling along the auxiliary track mentioned on the four rollers 101 carried by the underframe thereof, as previously noted. In passing, it is mentioned that in loading the freight containers 100 upon the railway car 40, each of the freight containers 100 is brought into proper cooperating position with respect to one of the associated tie-down shock-absorber mechanisms 46; whereupon the mechanism 46 mentioned is actuated from its retracted position into its operated position for the purpose of providing the operative connection between the freight container 100 and the center sill 41; which operative connection includes the combined tie-down and shock-absorber functions of the mechanism 46, as previously explained.

Considering now in greater detail the construction of the freight container 100, and referring particularly to FIGS. 1, 4 and 8, the freight container 100 essentially comprises a rigid underframe 104 that carries a floor 105, upstanding boundary wall structure 106 and a roof 107. The opposite sides of the wall structure 106 are provided with suitable door structures, double doors 108 being illustrated for the purpose of the present description; whereby it will be understood that the lading that is carried in the freight container 100 may be readily loaded and unloaded through the doorways in the opposite side walls thereof when the doors 108 occupy their open positions.

The underframe 104 is fabricated from suitable preformed steel sections and comprises, as best shown in FIG. 8, substantially rectangular perimeter structure, including a pair of longitudinally extending and laterally spaced-apart side channels 109 and a pair of laterally extending and longitudinally spaced-apart end channels 110, the flanges of the channels 109 and 110 being inwardly directed and suitably secured together, as by welding. Further, the underframe 104 comprises, as best shown in FIG. 4, two pairs of laterally extending and longitudinally spaced-apart I-beams 111 respectively disposed longitudinally inwardly with respect to the adjacent end channels 110, as well as a number of laterally extending and longitudinally spaced-apart I-beams 112 arranged adjacent to the midportion of the underframe 104, and also a pair of laterally extending plates 113 respectively disposed between the adjacent pairs of I-beams 111-112. The opposite ends of the I-beams 111 and 112 and the opposite ends of the plates 113 are rigidly secured to the respective side channels 109, thereby to provide the rigid underframe 104. In the arrangement, the pair of longitudinally extending and laterally spaced-apart tie-down bars 103 extend through aligned openings provided in the I-beams 111 and 112 and in the plates 113, and the opposite ends of the bars 103 are rigidly secured to the end channels 110 so as further to provide tie-structure in order to insure a rigid construction of the underframe 104. Also, the tie bars 103 are suitably secured as by welding, to the adjacent portions of the elements 111, 112 an 113, through which they extend.

In view of the foregoing, it will be understood that at each end of the underframe 104, there is arranged a pair of the laterally extending and longitudinally spaced-apart I-beams 111; which pair of I-beams 111 are secured together by two pairs of longitudinally extending and laterally spaced-apart substantially L-shaped plates 114. The plates 114 are arranged in inverted position, as best shown in FIG. 8, and the opposite ends thereof are rigidly secured to the adjacent portions of the I-beams 111 between the inwardly directed flanges thereof. Accordingly, each pair of plates 114 cooperating with the associated pair of I-beams 111 define an open box-like structure in which one of the rollers 101 is mounted. As best shown in FIG. 8, each flanged roller 101 is rotatably mounted upon an associated axle 115 that extends laterally between the associated pair of longitudinally extending plates 114. In the arrangement the box-like structures defined by the pairs of plates 114 are disposed laterally outwardly with respect to the tie bars 103, so that each laterally spaced-apart pair of flanged rollers 101 are positioned at the required narrow gauge of the auxiliary track provided on the top of the center sill 41 of the railway car 40, as shown in FIG. 8. Of course, the two pairs of flanged rollers 101 are longitudinally aligned so that the freight container 100 is properly centered upon the top of the center sill 41 of the railway car 40 when it is carried thereby.

Again referring to FIG. 8, it will be observed that the central portions of the end channels 110, the I-beams 111 and 112 and the plates 113 are formed so that a composite centrally disposed longitudinally extending saddle 116 is defined in the bottom of the underframe 104 and so that the flanged rollers 101 are arranged in this saddle 116. More particularly, the flanged rollers 101 of each pair are disposed laterally adjacent to the respective sides of the saddle 116; and the plates 114 extend downwardly somewhat less than the extent of the end channels 110, the I-beams 111 and 112 and the plates 113, so that the axles 115 are disposed in a plane positioned above the plane of the bottom surface of the underframe 104 and positioned below the floor 105; whereby the flanged rollers 101 are also positioned below the floor 105 and entirely within the saddle 116. More specifically, as illustrated in FIG. 8, the flanges 102 of the rollers 101 project downwardly toward the plane of the bottom surface of the underframe 104, but terminate thereabove; whereby the flanges 102 of the rollers 101 are disposed slightly above a flat surface arranged in supporting relation with respect to the bottom surface of the underframe 104 of the freight container 100.

Finally, in the construction of the freight container 100, it is noted that the extreme lower end of the boundary wall structure 106 is arranged exteriorly of and in wraparound relation with respect to the side and end channels 109 and 110, respectively; while the floor 105 is supported about the perimeter thereof by the inwardly directed flanges carried by the side and end channels 109 and 110, respectively. Also, the intermediate portions of the floor 105 are directly supported by the top flanges of the I-beams 111 and 112 and by the top edges of the plates 113. The floor 105 may be formed of sheet steel and directly suitably welded to the engaged supporting elements of the underframe 104.

Referring now to FIGS. 2, 3, 5, 6 and 7, the highway semi-trailer 60 comprises an elongated longitudinally extending rigid frame or chassis 61 that carries the usual spring-supported rear road wheels 62 adjacent to the rear end thereof and the usual king pin 63 adjacent to the front end thereof; which king pin 63 is adapted to cooperate with the fifth-wheel mechanism 14 carried by the rear portion of the highway tractor 13, in the usual manner. Also, the intermediate front portion of the underframe 61 carries the usual front end landing-gear or dolly mechanism 64 that is movable between projected and retracted positions. The front end dolly mechanism 64 in its projected position supports the front end of the underframe 61, when the king pin 63 is detached or disconnected from the fifth-wheel mechanism 14; and, of course, the front end dolly mechanism 64 is operated into its retracted position, when the king pin 63 is attached or connected to the fifth-wheel mechanism 14; all in the usual manner.

The underframe 61 comprises a pair of longitudinally extending and laterally spaced-apart channels 65 that are interconnected at the front ends thereof by a suitable front end member 66 and that are interconnected at the rear ends thereof by a suitable rear end member 67. A first pair of laterally extending and longitudinally spaced-apart angle members 68 are secured in place between the flanges of the side channel 65 adjacent to and rearwardly of the front end member 66; and a second pair of laterally extending and longitudinally spaced-apart angle members 68 are secured in place between the flanges of the side channel 65 adjacent to and forwardly of the rear end member 67; the side channels 65 are also secured together by a number of laterally extending and longitudinally spaced-apart brace members 69 that are positioned intermediate the two pairs of angle members 68; and further, the side channels 65 are secured together by a number of pairs of cross-braces 70 that are positioned between two of the brace members 69. Accordingly, the underframe 61 of the highway semi-trailer 60 is of narrow elongated rigid structure.

Also the side channels 65 carry two longitudinally extending angle members 71 adjacent to the upper outside portions of the webs thereof; which angle members 71 are rigidly secured in place, as by welding, so as to lend additional rigidity to the underframe 61 and so as to define, together with the upper flanges of the side channel 65, a pair of longitudinally extending and laterally spaced-apart composite rails 72 of an auxiliary track disposed on the top of the underframe 61. This auxiliary track provided on the top of the underframe 61 is of the same narrow gauge as that of the flanged rollers 101 carried by the underframe 104 of the freight container 100, and thus of the same narrow gauge as that of the auxiliary track provided on the top of the center sill 41 of the railway car 40. Each of the rails 72 has the general configuration of the top flange of an I-beam, as clearly illustrated in FIGS. 5 and 7; whereby the rails 72 are adapted to engage and to support the flanged rollers 101 carried by the underframe 104 of the freight container 100. Specifically, in the arrangement, the flanges 102 provided on each pair of laterally spaced-apart rollers 101 straddle the rails 72 of the auxiliary track provided on the top of the underframe 61 and guide upon the respectively associated angle members 71, as best shown in FIG. 7.

The front pair of angle members 68 cooperates with the adjacent portions of the side channels 65 to define a front substantially box-like structure in which there are arranged a pair of longitudinally extending and laterally spaced-apart shafts 73, the opposite ends of each shaft 73 being suitably journalled for rotation in cooperating bearings 74 respectively carried by the adjacent portions of the angle members 68. Likewise, the rear pair of angle members 68 cooperate with the adjacent portions of the side channels 65 to define a rear substantially box-like structure in which there are arranged a pair of longitudinally extending and laterally spaced-apart shafts 73, the opposite ends of each shaft 73 being suitably journalled for rotation in cooperating bearings 74 respectively carried by the adjacent portions of the angle members 68. A front pair of laterally spaced-apart securing devices 75 are respectively rigidly secured to the front pair of rotatably mounted shafts 73; and likewise, a rear pair of laterally spaced-apart securing devices 75 are respectively rigidly secured to the rear pair of rotatably mounted shafts 73. Each of the securing devices 75 is substantially L-shaped, including a laterally and inwardly directed arm terminating in a hook 76 that is arranged selectively to engage and to disengage the adjacent portion of the cooperating tie-down bar 103 carried by the underframe 104 of the freight container 100, when the freight container 100 occupies its supported position upon the underframe 61 of the highway semi-trailer 60, as particularly illustrated in FIGS. 5 and 7. For the purpose of actuating simultaneously the securing devices 75, mechanism is provided that includes a longitudinally extending rod 77 arranged substantially centrally of the underframe 61 and journalled for rotation in aligned openings provided in the laterally extending elements 68, 69 and 70. Specifically, the rod 77 is journalled for rotation in cooperating bearings 78 carried by the angle member 68, as illustrated in FIG. 6. Rigidly secured to the opposite ends of the rod 77 are two links 79; and the opposite ends of each of the links 79 are respectively connected to the lower arms of the associated pair of securing devices 75 by a pair of links 80 employing cooperating pins, indicated at 81 and 82 in FIG. 5. The extreme lower end of at least one of the links 79 is operatively connected by a coil spring 83 to one of the angle members 68, so as to bias the link 79, and consequently the rod 77, for rotation in the clockwise direction, as viewed in FIG. 5. Also, at the extreme lower end of the link 79, to which the coil spring 83 is attached, an operating rod 84 is connected by a pin 85; which operating rod 84 extends laterally through an opening provided in one of the side channels 65, as illustrated in FIG. 5. More particularly, the operating rod 84 extends to the exterior of the underframe 61 and terminates in a loop-like handle 84a to facilitate longitudinal sliding movement thereof. A pair of laterally spaced-apart holes 86 are formed in the outer end of the operating rod 84 exteriorly of the adjacent side flange 65, and each of the holes 86 is adapted to receive a cooperating latch pin 87 that may be projected therethrough into cooperating relation with respect to a fixture 88 carried by the lower portion of the side flange 65 disposed immediately below the operating rod 84.

As illustrated in FIGS. 5 and 6, the operating rod 84 occupies its fully withdrawn position effecting rotation of the associated link 79 in the clockwise direction, as viewed in FIG. 5; whereby the longitudinally extending rod 77 is rotated therewith, so as to cause the front and rear pairs of securing devices 75 to be moved into their released positions with respect to the tie-down rods 103 carried by the underframe 104 of the freight container 100; and the operating rod 84 is restrained in its fully withdrawn position against the bias of the coil spring 83 by the insertion of the latch pin 87 into the inner hole 86 through the operating bar 84 and into cooperating relation with respect to the fixture 88. When the hooks 76 carried by the inner ends of the arms of the securing devices 75 occupy their unlatched positions illustrated in FIG. 5, they are disposed below the top of the underframe 61, so that they do not interfere with rolling movement of the freight container 100 upon the top of the underframe 61. In order to operate the hooks 76 into their latched positions with respect to the tie-down rods 103 carried by the underframe 104 of the freight container 100, it is only necessary to withdraw the latch pin 87 from the associated hole 86 provided in the operating bar 84, whereby the coil spring 83 rotates the connected link 79 in the counterclockwise direction, as viewed in FIG. 5; whereby the links 79 simultaneously actuate the hooks 76 through the connected links 80 into their latched positions and into engagement with the tie-down bars 103 carried by the underframe 104 of the freight container 100, as shown in FIG. 7. In order positively to insure that the hooks 76 are restrained in their latched positions, after movement thereto by the coil spring 83, the latch pin 87 may be again inserted through the outer hole 86 provided in the operating bar 84 and into cooperating relation with the fixture 88.

In view of the foregoing, it will be understood that the operating bar 84 may be readily latched and unlatched with respect to either of its positions; whereby the hooks 76 may be readily restrained in either their latched or unlatched positions with respect to the tie-down bars 103 carried by the underframe 104 of the freight container 100. Of course, it will be appreciated that the movement of the operating bar 84 is transmitted from one of the links 79 via the rotatably mounted rod 77 to the other of the links 79; whereby the two pairs of securing devices 75 are actuated in unison between their latched and unlatched positions, as explained above.

Considering now the overall operation of the freight transportation system, as illustrated in FIG. 2, it will be understood that the height of the roadway 12 is correlated with respect to the height of the railway track 11, so that the top of the frame 61 of the highway semi-trailer 60 is disposed substantially in the plane of the top of the center sill 41 of the railway car 40; and so that when the highway tractor 13 backs the highway semi-trailer 60 into its adjacent position with respect to either end of the railway car 40, the auxiliary track provided on the top of the frame 61 of the highway semi-trailer 60 is disposed in alignment with and in the same plane as the auxiliary track disposed on the top of the center sill 41 of the railway car 40; whereby the freight container 100 may be moved in either direction, as required, between the highway semi-trailer 60 and the railway car 40. First assuming that the required alignment between the two auxiliary tracks has been achieved and that it is desired to move the freight container 100 carried by the highway semi-trailer 60 onto the railway car 40, the handle 84a carried by the operating bar 84 is manipulated so as to actuate the hooks 76 into their unlatched positions with respect to the tie-down bars 103 carried by the underframe 104 of the freight container 100; whereby the freight container 100 may be readily rolled upon its flanged rollers 101 from the auxiliary track provided on the top of the frame 61 onto the auxiliary track provided on the top of the center sill 41. More particularly, the freight container 100 is rolled along the auxiliary track provided on the top of the center sill 41 until it is in the desired and proper position in cooperating relation with one of the mechanisms 46; whereupon the mechanism 46 is operated in order to cause the hooks 50 thereof to be operated from their retracted positions into their latched positions wth respect to the associated tie-down bars 103 carried by the underframe 104 of the freight container 100. Now assuming that the required alignment between the two auxiliary tracks has been achieved and that it is desired to move the freight container 100 carried by the railway car 40 onto the semi-trailer 60, the mechanism 46 carried by the center sill 41 is operated to move the hooks 50 into unlatched positions with respect to the tie-down bars 103; whereupon the freight container 100 may be readily rolled from the auxiliary track provided on the top of the center sill 41 onto the auxiliary track provided on the top of the frame 61. When the freight container 100 is in the proper position upon the highway semi-trailer 60, the handle 84a caried by the operating bar 84 is actuated so as to set the hooks 76 into their latched positions with respect to the tie-down bars 103; and then the latch pin 87 is set, as previously explained, in order to restrain the hooks 76 in their latched positions.

Now when the freight container 100 is latched in place upon the top of the frame 61 of the highway semi-trailer 60, it is substantially rigidly secured to the frame 61, since there is no occasion to shock longitudinal forces in conjunction with the operation of the highway semi-trailer 60, since the same in its normal operation is not subjected to severe longitudinal shocks, as is the case of the railway car 40. On the other hand, as previously noted, when the freight container 100 is latched in place upon the top of the center sill 41 of the railway car 40, it is mounted by the cooperating mechanism 46 for limited rolling movements along the center sill 41, so as to prevent the transmission thereto of the severe longitudinal shocks to which the railway car 40 is normally subjected in operation.

When the freight container 100 occupies its supported position upon the frame 61 of the highway semi-trailer 60, as shown in FIG. 7, the plane of the bottom of the underframe 104 overhangs the plane of the top of the frame 65 due to the provision of the longitudinally extending saddle 116 in the underframe 104 and the low projection of the flanged rollers 101 downwardly into the saddle 116 and into engagement with the rails 72 of the auxiliary track provided on the top of the frame 65. This arrangement contributes to a low center of gravity of the freight container 100 in its supported position upon the frame 65 of the highway semi-trailer 60. Similarly, when the freight container 104 occupies its supported position upon the center sill 41 of the railway car 40, as shown in FIG. 8, the plane of the bottom of the underframe 104 overhangs the plane of the top of the center sill 41 due to the provision of the longitudinally extending saddle 116 in the underframe 104 and the low projection of the flanged rollers 101 downwardly into the saddle 116 and into engagement with the rails 45 of the auxiliary track provided on the top of the center sill 41. This arrangement contributes to a low center of gravity of the freight container 100 in its supported position upon the center sill 41 of the railway car 40.

Referring now to FIG. 9, a modified form of the transporting system, embodying the present invention, is there illustrated that comprises a highway tractor 13, a highway semi-trailer 60a, and a ship 150, as well as a plurality of the freight containers 100. In this form of the highway semi-trailer 60a, the frame 61a thereof is substantially longer than the corresponding frame 61 of the highway semi-trailer 60; whereby the highway semi-trailer 60a is capable of carrying two, instead of one, of the freight containers 100. Also, in this arrangement, the adjacent end (either bow or stern) of the ship 150 is provided with a hatch door, not shown, that may be selectively moved between open and closed positions with respect to an associated hatch opening, so as to accommodate the movement in either direction of the freight containers 100 into and out of the hold of the ship 150. In the arrangement, a railway track 151 is arranged within the hold of the ship 150, which railway track 151 is also of the previously described narrow gauge, so that it is capable of cooperative ralation with the rollers 101 carried by the underframe 104 of the freight container 100, in the manner previously explained.

Further, the ship 150 comprises a "drawbridge" 152 that is pivotally mounted at the inner end thereof, as indicated at 153; which drawbridge 152 also carries a railway track 154 of the previously mentioned narrow gauge. The inner end of the railway track 154 carried by the drawbridge 152 cooperates with the adjacent end of the railway track 151 arranged in the hold of the ship 150; and the outer end of the railway track 154 carried by the drawbridge 152 is adapted to cooperate with the auxiliary track provided on the top of the frame 61a of the highway semi-trailer 60. In the arrangement, the pier 155 upon which the highway semi-trailer 60a is supported, is provided with an abutment 156 that supports the outer end of the drawbridge 152, when the drawbridge 152 occupies its operated position spanning the gap between the pier 155 and the adjacent end of the ship 150, as illustrated in FIG. 9. When the drawbridge 152 occupies its spanning position illustrated in FIG. 9, it is apparent that the freight containers 100 may be readily moved in either direction between the frame 61a of the highway semi-trailer 60a and the railway track 151 carried in the hold of the ship 150 and across the section of railway track 154 carried by the drawbridge 152. For the purpose of moving the drawbridge 152 into and out of its operative spanning position, as explained above, a motorized reel 157 is provided in the hold of the ship 150 and connected by an associated flexible cable 158 to the outer end of the drawbridge 152. Of course, the selective operation of the motorized reel 157 is effective appropriately to move the drawbridge 152 into and out of its spanning position, as illustrated in FIG. 9. In passing, it is mentioned that the normal stored position of the drawbridge 152 is illustrated in dotted lines in the hold of the ship 150; whereby at this time, a hatch door, not shown, of the ship 150 may be operated into its closed position to render the ship watertight. Further, it is pointed out that suitable latch mechanisms, indicated at 159, are carried by the railway track 151 for the purpose of restraining the freight containers 100 in their supported positions upon the railway track 151 in the hold of the ship 150.

Finally, in conjunction with the storage of the freight containers 100 in the hold of the ship 150, it is noted that by the utilization of hoisting mechanism, not shown, that is normally provided in the hold of the ship 150, one or more of the freight containers 100 may be arranged in stacked relation with respect to other of the freight containers 100, as explained more fully hereinafter, for the purpose of conserving cargo space in the hold of the ship 150.

Referring now to FIG. 10, a modified form of the freight container 200 is there illustrated that is essentially of the construction of the freight container 100, as best shown in FIGS. 1, 4, and 8; which freight container 200 comprises a rigid underframe 204 carrying a floor 205 and upstanding boundary wall structure 206. In this construction, the two longitudinally spaced-apart pairs of laterally spaced-apart flanged rollers 201 carried by the underframe 204 project well downwardly below the bottom plane of the underframe 204 and are adapted to engage a substantially horizontal supporting surface upon which the freight container 200 is mounted, as well as to cooperate with the auxiliary track provided on the top of the frame 65 of the highway semi-trailer 60 or the auxiliary track provided on the top of the center sill 41 of the railway car 40, in the manner previously explained.

More particularly, in this case, each pair of longitudinally extending and laterally spaced-apart angle members 214 rigidly secured to the underframe 204 depend therebelow and carry the axle 215 upon which the flanged roller 201 is rotatably mounted. Specifically, the roller 201 includes an inner rail-engaging annular portion 201a of small diameter and an outer highway-engaging annular portion 201b of large diameter. Thus the outer annular portion 201b constitutes a flange for the inner annular portion 201a; whereby the roller 201 is, in fact, a flanged roller, the annular abutment 201c joining the annular portions 201a and 201b constituting an annular guide flange cooperating with the outer edge of the associated rail. Moreover, each pair of laterally spaced-apart rollers 201 are inwardly facing so that they straddle the rails of the associated auxiliary track for the guide purpose, as previously explained. Further, the underframe 201 carries the longitudinally extending pair of laterally spaced-apart tie-down bars 203 that cooperate either with the hook structure 76 carried by the frame 65 of the highway semi-trailer 60 or the hook structure 50 carried by the center sill 41 of the railway car 40, for the purpose previously explained.

In this form of the freight container 200, there is, of course, no longitudinally extending saddle provided in the underframe 204; whereby the plane of the bottom of the underframe 204 is disposed somewhat above the plane of the top of the frame 65 of the highway semitrailer 60, when the freight container 200 occupies its supported position with respect thereto. Similarly, the plane of the bottom of the underframe 204 is disposed somewhat above the plane of the top of the center sill 41 of the railway car 40, when the freight container 200 occupies its supported position with respect thereto. Furthermore, as previously noted, the freight container 200 may be drawn along or otherwise rolled across a highway or other substantially horizontal supporting surface, at least for handling purposes, by virtue of the projection of the outer annular portions 201b of the rollers 201 well below the bottom plane of the underframe 204 and the rather broad extent of the annular surfaces 201b for this highway-engaging purpose.

Referring now to FIG. 11, the form of the freight container 300 there illustrated is fundamentally the same as that of the freight container 100, as previously described, except that in this case, the underframe 304 carries the two longitudinally spaced-apart pairs of laterally spaced-apart low rollers 301 that are entirely cylindrical and that carry no flanges thereon. Each of the rollers 301 is rotatably mounted upon the associated axle 315 that is carried by the associated pair of longitudinally extending and laterally spaced-apart angle members 314 that are rigidly secured to the underframe 304. In the construction, each of the rollers 301 depends into the centrally disposed longitudinally extending saddle 316 arranged in the underframe 304 and positioned near the adjacent side thereof, so that the lower surface of each roller 301 is disposed well above the plane of the bottom of the underframe 304. Accordingly, the shoulders 311a disposed at the opposite sides of each of the laterally extending elements 311, etc., defining the underframe 304 constitute guide members that cooperate with the adjacent edges of the rails of the associated auxiliary track provided either upon the top of the frame 65 or upon the top of the center sill 41 for the guide purpose, as previously explained. Recapitulating: in the freight container 300, the shoulders 311a constitute the guide members that cooperate with the rails of the auxiliary track, since the low rollers 301 are not flanged for the guide purpose.

Referring now to FIG. 12, the form of the freight container 300A there shown is identical to that of the freight container 300 shown in FIG. 11, except that in the freight container 300A the rollers that are adapted to be carried by the axles 315 are not assembled thereupon. More particularly, the freight containers 300A are frequently sold without the lower rollers; whereby the user may subsequently purchase and install therein either the flanged rollers 101, as shown in the form of the container 100 of FIG. 8, or the lower rollers 301 as shown in the form of the container 300 of FIG. 11.

Moreover, it is pointed out some users of the freight containers 300A handle the containers entirely by crane, or other hoisting devices; whereby the rollers are, in fact, never installed upon the shafts 315 that are provided for the purpose of mounting the rollers, in the event that they are employed.

In the last mentioned case where the container 300A is employed without the rollers on the underframe 304 thereof, the container is lifted by a hoist, or the like, between its supported position upon the top of the frame 65 of the highway semi-trailer 60 and its supported position upon the top of the center sill 41 of the railway car 40. In this case, the lower portions of the elements 311, etc., forming the underframe 304 directly engage the cooperating auxiliary track; and the underframe 304 is secured in place by the cooperation of the tie-down rods 303 and the associated hook structure, all in the manner previously explained. When the container 300A occupies its mounted position upon the top of the frame 65 of the highway semi-trailer 60, it is not arranged for longitudinal movements, so that the absence of the low rollers from the underframe 304 is of no moment. On the other hand, when the container 300A occupies its mounted position upon the top of the center sill 41 of the railway car 40, it is arranged for longitudinal sliding movements as previously explained, and the absence of the low rollers from the underframe 304 merely increases sliding friction between the underframe 304 and the top of the center sill 41, without preventing limited longitudinal sliding movements of the freight container 300A with respect to the railway car 40, as previously explained.

Referring now to FIG. 13, the modified form of the freight container 400 there illustrated is of the basic construction of that of the container 100 previously described, and in this case, the rigid underframe 404 thereof comprises the laterally extending and longitudinally spaced-apart end channels 409 and the longitudinally extending and laterally spaced-apart side channels 410 that are rigidly secured together. The centrally disposed and longitudinally extending saddle 416 that is formed in the laterally extending elements 409, etc., accommodates the top of the associated frame 65 of the highway semi-trailer 60 or the top of the center sill 41 of the railway car 40; all in the manner previously explained. The floor 405 and the upstanding side wall structure 406 are carried by the top of the underframe 404; and further, the underframe 404 carries two pairs of laterally spaced-apart fixtures 414, each pair of fixtures 414 projecting forwardly with respect to the associated end channel 409. Each of the fixtures 414 carries an associated bracket 414a that is pivotally connected thereto by an associated pivot pin 414b; which bracket 414a is bifurcated to provide a pair of longitudinally extending and laterally spaced-apart arms 414c that carry an associated axle 415 upon which a flanged roller 401 is rotatably mounted. Accordingly, the underframe 404 carries four flanged rollers 401 arranged in longitudinally spaced-apart pairs that are laterally spaced-apart with respect to each other; which rollers 401 are selectively movable between active and inactive positions. More particularly, each of the rollers 401 may be moved into an inactive position, as shown in dotted lines in FIG. 13, upon movement of the associated bracket 414a about the pivot pin 414b connecting the same to the associated fixture 414. Conversely, each of the rollers 401 may be moved into an active position, as shown in solid lines in FIG. 13, upon movement of the associated bracket 414a about the cooperating pivot pin 414b. When the roller 401 occupies its active position, as shown in solid lines in FIG. 13, it is disposed below the underframe 404 and in position to engage the cooperating rail of the associated auxiliary track, the arm 414c engaging the saddle 416 provided in the associated end channel 409 for supporting purpose. On the other hand, when the roller 401 occupies its inactive position, it is totally removed from below the underframe 404 and is disposed above the underframe 404 and adjacent to the end wall 406, as indicated in dotted lines in FIG. 13.

Of course, the four rollers 401 are all moved into their active positions for cooperation with the associated auxiliary track, and at this time, the underframe 404 may be secured in place upon the associated supporting auxiliary track by cooperation of the tie-down bars 403 and the associated hook structure carried by the supporting vehicle, in the manner previously explained. Of course, when the four rollers 401 occupy their inactive positions, the freight container 400 may be supported upon a suitable supporting surface by direct engagement of the bottom of the underframe 404 with the supporting surface mentioned, since at this time, the four rollers 401 in their inactive positions are disposed well above the underframe 404.

Referring now to FIGS. 14A, 14B and 15, a modified form of the freight container 500 is shown in cooperating relationship with the center sill 41 of the railway car 40; which freight container 500 comprises the underframe 504 that includes the laterally extending and longitudinally spaced-apart end channels 509 and the longitudinally extending and laterally spaced-apart side channels 510; which underframe 504 carries the floor 505 and the upstanding side wall structure 506. The laterally extending members 509, etc., are provided with the centrally disposed and longitudinally extending saddle 516 therein that is adapted to straddle the auxiliary track provided on the top of the center sill 41; all in the manner previously explained.

In this construction, the underframe 504 carries four of the rollers 501 that are respectively mounted upon the four axles 515 that are respectively carried by the four arms 514. The inner ends of each pair of arms are pivotally mounted upon a laterally extending pivot bar 514a carried by the side channels 510; whereby each pair of the rollers 501 are movable between an inactive position, as shown in FIG. 14A, and an active position, as shown in FIG. 14B; also the inactive position of the roller 501 is shown in solid lines in FIG. 15, while the active position thereof is shown in dotted lines therein. Further, the underframe 504 carries four rigid stops 514b that respectively cooperate with the four pivotally mounted arms 514 for the purpose of restraining the arms 514 in their active positions, thereby to restrain the rollers 501 in their active positions; all as clearly illustrated in FIG. 15.

When the rollers 501 occupy their inactive positions, as illustrated in solid lines in FIG. 15, the saddle 516 provided in the various laterally extending members 509, etc., directly engages the rails 45 of the auxiliary track provided on the top of the center sill 41 for the purpose of supporting the freight container 500; while the four rollers 501 in their inactive positions merely rest upon the tops of the associated rails 45, without supporting the associated freight container 500. On the other hand, when the rollers 501 occupy their active positions, as illustrated in dotted lines in FIG. 15, the saddle 516 provided in the various laterally extending members 509 is positioned above the rails 45 and the rollers 501 directly carry the weight of the freight container 500, the arms 514 being restrained in their active positions at this time by engagement with the associated stops 514b. Accordingly, it will be understood that when the rollers 501 are moved into their inactive positions, the freight container 500 is lowered into direct engagement with the rails 45, as shown in FIG. 14A; on the other hand, when the rollers 501 are moved into their active positions, the freight container 500 is elevated out of direct contact with the rails 45, as shown in FIG. 14B. More particularly, when the rollers 501 occupy their inactive positions, the freight container 500 is supported upon the rails 45 by direct engagement of the underframe 504 with the rails 45; and when the rollers 501 occupy their active positions, the freight container 500 is supported upon the rails 45 by direct engagement of the rollers 501 therewith and with the underframe 504 elevated out of contact with the rails 45.

The active and inactive positions of each of the rollers 501 are respectively disposed upon opposite sides of the associated pivot bar 514a, as clearly shown in FIG. 15; whereby the active position of each of the arms 514, and consequently of each of the rollers 501, constitutes a stable position thereof, since the arm 514 in its active position is restrained therein by engagement with the associated stop 514b carried by the underframe 504.

For the purpose of moving the rollers 501 from their inactive positions of FIG. 14A into their active positions of FIG. 14B, a pair of actuating pins 41a are respectively carried by the I-beams comprising the center sill 41 of the railway car 40, as illustrated in FIG. 15. Accordingly, when the actuating pins 41a occupy their retracted positions, the freight container 500 may be placed in supported position upon the top of the center sill 41 and slid longitudinally therealong. In the arrangement, after the front end channel 509 has passed over the tops of the pair of actuating pins 41a in their retracted positions, the actuating pins 41a may be operated into their projected positions so that they are then in interfering relation with respect to the associated front pair of rollers 501. Continued forward movement of the freight container 500 causes the front pair of rollers 501 directly to engage the projected actuating pins 41a; whereby the front end of the freight container 500 is lifted as the pair of arms 514 are pivoted in the counterclockwise direction about the pivot pin 514a, as viewed in FIG. 15; whereby the front pair of rollers 501 are operated from their inactive positions, as shown in solid lines therein, into their active positions, as shown in dotted lines therein. Of course, continued forward movement of the freight container 500 causes the actuating pins 41a to engage the rear pair of rollers 501; whereby the rear pair of rollers are operated from their inactive positions into their active positions in a similar manner. At this time, the actuating pins 41a may be operated back into their retracted positions, so that they do not interfere with the rear end channel 509.

In the operation of this form of the freight container 500, the same is normally lifted by a hoist onto the top of the center sill 41 of the railway car 40 and is then drawn forwardly along the center sill 41 into cooperating relation with respect to the actuating pins 41a for the purpose of effecting the operation of the rollers 501 from their inactive positions into their active positions, as explained above. Thereafter, the freight container 500 may be rolled longitudinally along the auxiliary track provided on top of the center sill 41 of the railway car 40 and onto the auxiliary track provided on the frame 65 of the highway semi-trailer 60, in the manner previously explained. However, subsequenlty when the freight container 500 is hoisted, the rollers 501 are automatically returned by gravity back into their inactive positions; whereby the freight container 500 may be directly supported upon a supporting surface by direct engagement of the underframe 504.

Referring now to FIGS. 16 and 17, a modified form of the freight container underframe 604 is illustrated that comprises a pair of laterally extending and longitudinally spaced-apart side channels 609 and a pair of laterally extending and longitudinally spaced-apart end channels 610 suitably welded together adjacent to the ends thereof. Also, the underframe 604 comprises a pair of longitudinally extending and laterally spaced-apart intermediate channels 609a and a number of laterally extending and longitudinally spaced-apart intermediate I-beams 611, thereby providing the strong rigid composite underframe 604.

Also, the underframe 604 comprises front and rear pairs of longitudinally extending and laterally spaced-apart channel members 614, each of the channel members 614 extending longitudinally between the adjacent pair of intermediate I-beams 611 disposed adjacent to one of the end channels 610 and also positioned laterally between the adjacent side channel 609 and the adjacent intermediate channel 609a. In the box-like volume defined between each of the channel members 614 and the associated intermediate channel 609a, one of the rollers 601 is arranged upon its cooperating supporting axle 615. Accordingly, the underframe 604 carries front and rear longitudinally spaced-apart pairs of laterally spaced-apart flanged rollers 601 that are of the narrow gauge of the auxiliary tracks provided on the top of the frame 65 and on the top of the center sill 41 for the previously described purpose. Also the underframe 604 carries front and rear longitudinally spaced-apart pairs of laterally spaced-apart tie-down members 603. Each of the tie-down members 603 is rigidly secured to the adjacent portion of the intermediate channel 609a in lateral alignment with the associated roller 601 and projecting laterally inwardly with respect thereto, as shown in FIG. 17.

When the underframe 604 is mounted upon the frame 65 of the highway semi-trailer 60, the front and rear pairs of hooks 76 respectively cooperate with the front and rear pairs of tie-down members 603, the longitudinal spacing between the front and rear pairs of tie-down members 603 corresponding to the longitudinal spacing between the front and rear pairs of hooks 76 in order to obtain the cooperation mentioned. On the other hand, when the underframe 604 is mounted upon the center sill 41 of the railway car 40, only the rear pair of tie-down members 603 cooperate with the associated pair of hooks 50 carried by the cooperating tie-down and shock-absorbing mechanism 46 provided in the center sill 41, for the purpose mentioned. Of course, it will be understood that when the underframe 604 is mounted upon the center sill 41 of the railway car 40, it is necessary to position the same longitudinally therealong so that the hooks 50 of the cooperating mechanism 46 are positioned in alignment with the rear pair of tie-down members 603 for the tie-down purpose.

Referring now to FIGS. 18 and 18, a modified form of the freight container underframe 704 is illustrated that is especially adapted for use upon the railway car 40; which underframe 704 comprises a pair of laterally extending and longitudinally spaced-apart side channels 709 and a pair of laterally extending and longitudinally spaced-apart end channels 710 suitably welded together adjacent to the ends thereof. Also the underframe 704 comprises a pair of longitudinally extending and laterally spaced-apart intermediate channels 709a and a number of laterally extending and longitudinally spaced-apart intermediate channels 711, thereby providing the strong rigid composite underframe 704.

Also the underframe 704 comprises front and rear laterally extending and longitudinally spaced-apart channels 711a respectively disposed outwardly with respect to the adjacent intermediate channels 711 and respectively disposed inwardly with respect to the adjacent end channels 710. Each of the channels 711a is secured at the opposite ends thereof to the adjacent intermediate channels 709a thereby to provide a box-like structure 703 adjacent to the end of the underframe 704; which box-like structure 703 at the rear end of the underframe 704 is adapted to receive the cooperating pair of hooks 50 carried by the associated mechanism 46 arranged in the center sill 41 of the railway car 40, as explained more fully hereinafter. Also the intermediate channels 711 disposed adjacent to the opposite ends of the underframe 704 carry a pair of laterally spaced-apart and outwardly projecting studs 714 that respectively carry in cooperation with the adjacent intermediate channels 711 the axles 715 upon which the flanged rollers 701 are rotatably mounted. Of course, the gauge of the two pairs of low rollers 701 match the gauge of the auxiliary track provided on the top of the center sill 41 of the railway car 40 for the supporting purpose as previously explained.

Further the underframe 704 comprises a pair of guide plates 711b respectively arranged at the opposite ends thereof and adapted to cooperate with the hooks 50 carried by the associated mechanism 46 in the center sill 41 of the railway car 40. More particularly, each of the guide plates 711b is arranged at the corresponding end of the underframe 704 and is positioned between the adjacent ends of the intermediate channels 709a and extend longitudinally between the lower flange of the adjacent end channel 710 and the lower flange of the adjacent channel 711a. As illustrated in FIG. 19, the lower flange of the end channel 710 is disposed substantially below the lower flange of the channel 711a, whereby the guide plate 711b is upwardly and inwardly inclined from the saddle 716 provided in the adjacent end channel 710 to the open box-like structure 703.

When the underframe 704 is mounted upon the center sill 41 of the railway car 40 it is supported by the low rollers 701 in direct engagement with the rails 45 provided on the top of the center sill 41 with the saddle 716 formed in the various laterally extending element 710, etc., straddling the center sill 41 in the manner previously described. After the underframe 704 has been rolled along the center sill 41 substantially into proper relationship with the associated mechanism 46, but while the underframe 704 is disposed somewhat forwardly with respect to its final cooperating position with the associated mechanism 46, the mechanism 46 may be operated so as to actuate the hooks 50 thereof from their fully retracted positions upwardly toward their projected positions and into engagement with the associated guide plate 711b. At this time the boxlike structure 703 at the rear of the underframe 704 is disposed somewhat forwardly of its final position with respect to the cooperating mechanism 46, whereby the underframe 704 may be moved further rearwardly, simultaneously with further actuation of the hooks 50 of the mechanism 46 further toward their projected positions, whereby the hooks 50 ride along the guide plate 711b and are guided directly into alignment with the hollow box-like structure 703. More particularly, when the hooks 50 of the mechanism 46 are disposed in alignment with the hollow box-like structure 703 and directly therebelow, the hooks 50 move upwardly into the hollow box-like structure 703, thereby preventing further rolling movement of the underframe 704 along the top of the center sill 41. At this time the hooks 50 of the mechanism 46 may be actuated into their fully projected positions upwardly into the hollow box-like structure 703 and between the adjacent channels 711 and 711a disposed at the rear of the underframe 704, whereby at this time the underframe 704 is effectively connected to the mechanism 46 via the hooks 50 and thus to the center sill 41 of the railway car 40 for the shock-absorbing purpose, as previously explained. At this point it is noted that when the underframe 704 is thus effectively connected to the hooks 50 of the associated mechanism 46 it is not "tied-down" in the sense that the underframe 104 of the freight container 100 is tied-down by the cooperation between the tie-down bars 103 thereof and the hooks 50 of the mechanism 46. However, notwithstanding this lack of "tie-down," the underframe 706 is nevertheless effectively connected to the mechanism 46 carried by the center sill 41 of the railway car 40, since the hooks 50 are projected upwardly into the hollow box-like structure 703 allowing very small longitudinal movement of the underframe 704 with respect to the hooks 50, since the hooks 50 are designed substantially completely to fill up the space defined by the hollow box-like structure 703.

In passing it is noted that it is not fundamentally necessary to "tie-down" the underframe 704 in the vertical direction as long as it is suitably secured to the hook structure 50 for shock-absorbing of the longitudinal rolling movements thereof along the auxiliary track provided on the top of the center sill 41 of the railway car 40, whereby the arrangement described is altogether satisfactory for use in combination with the railway car 40.

Referring now to FIGS. 20, 21, and 22, the modified form of the freight carrier 800 there illustrated is especially adapted for use in conjunction with the railway car 40; whereby the freight container 800 comprises the rigid underframe 804 carrying the low flanged rollers 801 that cooperate with the auxiliary track provided on the top of the center sill 41; all in the manner previously described. In this construction the saddle 816 is provided in the central portions of the laterally extending elements 810, etc.; and each of the end channels 810 carries a pair of laterally spaced-apart tie-down devices 803 that respectively cooperate with the flanges of the rails 45 of the auxiliary track provided on the top of the center sill 41. More particularly, each of the tie-down devices 803 comprises a bracket 803a carrying a slidably mounted lock pin 803b having respective active and inactive positions. As illustrated in FIGS. 21 and 22, the lock pin 803b of the device 803 occupies its active or locked position underhanging the adjacent outwardly directed flange at the top of the adjacent I-beam of the center sill 41, thereby to secure the freight carrier 800 in its supported position upon the center sill 41. Of course, it will be understood that the lock pin 803 may be readily withdrawn into its inactive or unlocked position with respect to the adjacent flange of the I-beam of the center sill 41, so as to accommodate the removal of the freight container 800 from its supported position upon the center sill 41.

In the operation of the freight container 800, after the same has been brought into its proper supported position upon the center sill 41, the four devices 803 are individually operated into their locked positions, thereby to secure the freight container 800 in position upon the center sill 41. Of course, prior to removal of the freight container 800 from its supported position upon the center sill 41, each of the four devices 803 is manually operated into its unlocked position.

Also in this construction the underframe 804 is provided with structure, including the laterally extending and longitudinally spaced-apart elements 811 and 811a at the ends thereof and defining the hollow box-like structures 803 that are adapted to receive the hooks 50 of the mechanism 46 incorporated in the center sill 41, as illustrated in FIG. 22. This arrangement for selectively connecting the underframe 804 to the hooks 50 of the mechanism 46 is fundamentally the same as that previously described in conjunction with the modified form of the underframe 704 shown in FIGS. 18 and 19.

As illustrated in FIG. 22, the underframe 804 of the freight container 800 is operatively connected to the mechanism 46 carried in the center sill 41 by the hooks 50 in their projected positions in the box-like structure 803; while the underframe 804 is tied-down in the vertical direction with respect to the center sill 41 by the four devices 803 in their locked positions. Thus, the connection between the underframe 804 and the hooks 50 is established at the box-like structure 803 disposed at the rear of the underframe 804, while the vertical tie-down of the underframe 804 to the center sill 41 is effected by the operative positions of the four devices 803.

Referring now to FIGS. 23, 24 and 25, the freight containers 900 there illustrated are especially designed to accommodate stacking thereof; which stacking of the containers 900 is particularly useful when they are arranged in the hold of a ship in the general manner previously described in conjunction with FIG. 9, since this arrangement conserves valuable cargo space in the hold of the ship. As illustrated, the lower container 900 is directly supported upon cooperating rails 930 (greatly exaggerated in size for purpose of illustation) by the engagement of the rollers 901 carried by the underframe 904 with the rails 930.

The construction of the two containers 900 illustrated are identical; and, as best shown in FIG. 25, the rigid underframe 904 of each container 900 carries rigid upstanding structure 931, that in turn carries rigid overstructure 932. Specifically, the underframe 904 may include a number of substantially H-beams 933 arranged in turned positions with the flanges suitably welded together; and the rigid upstanding structure may consist essentially of corresponding H-beams or I-beams 931 constituting columns rigidly secured at the lower ends thereof to the H-beams 933 and rigidly secured at the upper ends thereof to the overstructure 932. The rigid overstructure 932 may comprise H-beams 934 that are suitably turned and welded in assembled relation together with laterally extending I-beams 935. Further, the freight container 900 comprises an upstanding boundary wall structure 906 and a connected roof 907; and the interior cargo space in the container 900 may be suitably lined with plywood sheets, as indicated at 940. As illustrated in FIG. 25, the saddle 916 is provided in the underframe 904, and the underframe 904 also carries the longitudinally spaced-apart pairs of laterally spaced-apart low flanged rollers 901; and in order to accommodate the stacking of the upper container 900 upon the lower container 900 four repressions or pockets 907a are provided in the roof 907 of the lower freight container 900 and arranged to receive the four low rollers 901 carried by the underframe 904 of the upper freight container 900.

When the upper freight container 900 occupies its stacked position with respect to the lower freight container 900, the bottom surface of the underframe 904 is supported directly upon the top of the overstructure 934, the lower surface of the underframe 904 directly engaging the roof 907, as shown in FIG. 25, and with the four low rollers 901 carried by the underframe 904 of the upper freight container 900 positioned in the four depressions 907a formed in the roof 907 of the lower freight carrier. Moreover, the upstanding side wall structure 906 of the upper freight container 900 is normally provided with depending skirt structure 906a that is positioned over the roof 907 of the low freight container 900 and in covering relation therewith by this telescopic connection between the upper and lower freight containers 900.

In order to prevent shifting of the upper freight container 900 with respect to the lower freight container 900, a number of lock keys 950 may be arranged in aligned openings provided in cooperating lugs 951 carried by the adjacent portions of the freight containers 900, as clearly shown in FIGS. 23 and 24. In the arrangement the lugs 951 are carried both at the top and at the bottom of the sides of the freight containers 900 so that the freight containers 900 may be stacked with either of them at the bottom of the stack or at the top of the stack, since the lock keys 950 cooperate with the lugs 951 disposed at the bottom of the upper container 900 and with the lugs 951 disposed at the top of the lower container 900, also as clearly shown in FIGS. 23 and 24. Of course, it will be understood that the upper container 900 is moved into and out of its stacked relation with the lower container 900 by a hoist or the like, that is normally provided in the hold of the ship for cargo handling purposes. After the upper container 900 has been arranged in stacked relation with respect to the lower container 900 in the hold of the ship, the lock keys 950 are arranged in cooperating relation with the lugs 951 in order to prevent shifting of the upper container 900 with respect to the lower container 900 in the hold of the ship. Moreover, it is customary to latch or otherwise to secure in place the lower container 900 with respect to the supporting rails 930; all in the manner previously explained.

Referring now to FIG. 26, the freight containers 1000 there illustrated are also especially designed to accommodate stacking thereof for the purpose previously explained. In this construction of the two containers 1000 arranged in stacked relation, each container 1000 comprises the rigid underframe 1004, the rigid overstructure 1032 and the rigid upstanding column structure 1031. The rigid overstructure 1032 carries a pair of longitudinally extending and laterally spaced-apart H-beams 1007 defining an auxiliary track of the narrow gauge of that of the low flanged rollers 1001 carried by the rigid underframe 1004; whereby the low flanged rollers 1001 carried by the underframe 1004 of the upper freight container 1000 engages the H-beams 1007 carried by the overstructure 1032 of the lower freight container 1000, while the low flanged rollers 1001 carried by the underframe 1004 of the lower freight container 1000 engages the cooperating rails 1030.

Each of the H-beams 1007 carries a cooperating locking device 1007a that is selectively operative into locked and unlocked positions with respect to the associated tie bar 1003 carried by the underframe 1004 of the supported freight container 1000, so that the upper freight container 1000 may be readily locked in place in its supported position on top of the lower freight container 1000.

The general purpose of the freight containers 1000 of FIG. 26 is the same as that of the freight containers 900 of FIGS. 23, 24 and 25; whereby the constructional details of the freight container 1000 are not further described in the interest of brevity.

Referring now to FIGS. 27, 28 and 29, in the forms of the transportation system there illustrated, the railway cars 40A, 40B and 40C are identical to the railway car 40 as shown in FIG. 1; whereby each of these railway cars comprises the elongated longitudinally extending center sill 41 carrying the four longitudinally spaced-apart tie-down shock-absorber mechanisms 46 that are employed for the purpose previously explained. However, in these cases, the freight containers illustrated are of a variety of different sizes; and specifically, the freight containers are of different sizes only with respect to the lengths thereof, each of the freight containers having the same width and the same height as the freight container 100, as heretofore described in conjunction with FIGS. 1, 2, 4, 7 and 8. Specifically, as illustrated, the railway car 40A carries two freight containers 1100B, one freight container 1100C and four freight containers 1100D; the railway car 40B carries one of the freight containers 1100A, and also a highway semi-trailer 1200; and the railway car 40C carries one of the freight containers 1100A, one of the freight containers 1100B, and a freight carrier 1300 in the form of a pallet.

Each of the freight containers 1100A is one-half size with respect to the length and capacity of the railway car, in the sense that the railway car is adapted to carry two of the freight containers 1100A. However, the railway car may carry one of the freight containers 1100A in conjunction with other freight carriers, as shown in FIGS. 28 and 29; whereby the carried freight container 1100A may be disposed at either end of the railway car or at the midportion of the railway car. Thus, in this arrangement, the freight container 1100A is tied-down to the center sill of the railway car utilizing two of the tie-down shock-absorber mechanisms 46. As illustrated in FIG. 28, the freight container 1100A is tied-down to the center sill 41 of the railway car 40B employing the two adjacent mechanisms 46 disposed at the left-hand end of the railway car 40B; and as illustrated in FIG. 29, the freight container 1100A is tied-down to the center sill 41 of the railway car 40C, employing the two adjacent mechanisms 46 disposed at the midportion of the railway car 40C.

Each of the freight containers 1100B is of one-quarter size with respect to the length and capacity of the railway car, in the sense that the railway car is adapted to carry four of the freight containers 1100B. However, the railway car may carry one or more freight containers 1100B in conjunction with other freight carriers, as shown in FIGS. 27 and 29; whereby the carried freight container 1100B may be disposed at any one of our positions along the center sill of the railway car in cooperative relation with any one of the four associated mechanisms 46. As illustrated in FIG. 27, the two freight containers 1100B are respectively disposed at the opposite ends of the railway car 40A and respectively cooperate with the associated mechanisms 46 respectively disposed at the adjacent ends of the center sill 41 thereof.

Each of the freight containers 1100C is of one-eighth size with respect to the length and capacity of the railway car, in the sense that the railway car is adapted to carry eight of the freight containers 1100C; whereby the carried freight container 1100C may be disposed at any one of the four positions along the center sill of the railway car in cooperative relation with a corresponding one of the mechanisms 46 or at any one of the four intervening positions and operatively connected to another of the freight containers that is, in turn, operatively connected to one of the mechanisms 46. Specifically, as shown in FIG. 27, the freight container 1100C is operatively connected to one of the mechanisms 46 disposed adjacent to the midportion of the center sill of the railway car 40A.

Each of the freight containers 1100D is of one-sixteenth size with respect to the length and capacity of the railway car, in the sense that the railway car is adapted to carry sixteen of the freight containers 1100D. In this arrangement, as shown in FIG. 27, one of the freight containers 1100D is positioned in cooperating relation with one of the tie-down shock-absorber mechanisms 46 disposed along the center sill 41 of the railway car 40A, and is, in turn, operatively connected to another of the freight containers 1100D by suitable tie bars. Specifically, as illustrated in FIG. 27, three of the freight containers 1100D are operatively connected together by the tie bar 1101 and the middle one of the three interconnected freight containers 1100D is operatively connected to the associated mechanism 46; whereby this group of three freight containers 1100D is mounted for the longitudinal shock-absorbing function by the mechanism 46 that is connected to the middle freight container 1100D, as described above.

A wide variety of suitable interconnections between the freight containers 1100D may be provided; however, in the illustrated arrangement, the longitudinally extending tie bars 1101 carry a number of depending lock pins 1102 that are received in cooperating lock loops or fixtures 1103 that are carried by the underframes of the freight containers 1100D. Also, the tie bars 1101 may be provided in variable lengths in order to accommodate the connection of one of the freight containers 1100D to an adjacent one of the freight containers 1100B, as shown on the left-hand side of the railway car 40A in FIG. 27; whereby in this arrangement, the tie bar 1101′ is of short length in that it is adapted only to tie the freight container 1100D to the adjacent freight container 1100B. Of course, this arrangement causes the mechanism 46 disposed adjacent to the left-hand end of the center sill 41 of the railway car 40A to provide the shock-absorbing function not only to the connected freight container 1100B, but also to the adjacent freight container 1100D that is connected by the tie bar 1101′ to the freight container 1100B. The arrangement of the tie bars 1101′ is not critical and has not been illustrated in great detail; however, it is recommended that these tie bars 1101′ be provided on both sides of the freight containers 1100D and interconnecting the respective sides of the underframes thereof.

In the foregoing description of the freight containers 1100A, 1100B, 1100C and 1100D, it will be understood that the basic construction thereof is the same as that of the freight container 100 described in detail in conjunction with FIGS. 1, 2, 4, 27 and 28; and particularly, it will be understood that each of these freight containers comprises the rigid underframe of the required length and of the standard width, as well as the upstanding body of the required length and of both the standard width and the standard height. Of course, in the freight containers of small size (1100C and 1100D), it is normally adequate to provide side door structure of the single-door type; whereas in the freight containers of large size (1100A and 1100B), it is normally more convenient to provide side door structure of the double-door type.

Again reverting to the underframe construction of each of these freight containers 1100A, 1100B, 1100C and 1100D, each of the underframes is not only of standard width, as previously described, but it also carries at the opposite ends thereof the laterally spaced-apart flanged rollers that are adapted to cooperate with the auxiliary track provided on the top of the center sill 41 of the railway car 40A, 40B, 40C, etc.; whereby each of the freight containers 1100A, etc., may be readily rolled along the auxiliary track mentioned. At this point, it is noted that each adjacent pair of the railway cars 40 is provided with track bridging structure, not shown; whereby the auxiliary tracks respectively provided on the tops of the center sills 41 of two connected ones of the railway car 40 may be selectively interconnected, so that a freight container may be readily rolled from one of the railway cars 40 over the bridging track structure mentioned on to the other of the railway cars 40.

Reverting to FIG. 29, it is pointed out that the freight carrier 1300 there illustrated is in the form of a pallet that, in effect, comprises an underframe and floor structure that is identical to that of the freight containers 1100B, with the elimination of the upstanding wall structure cooperating with the floor structure mentioned to define the cargo space. Of course, the underframe having only the floor structure provides the pallet construction described; whereby in this case, the lading 1301 rides directly on top of the floor structure 1302 of the pallet 1300; and in accordance with conventional practice, suitable tie structure 1303 is provided for the purpose of securely fastening the lading 1301 in place upon the floor structure 1302 of the pallet 1300. In the illustrated example of FIG. 29, the pallet 1300 may carry a number of rolls 1301 of paper of the character conventionally employed in printing newspapers; which rolls 1301 are suitably stacked in a frusto pyramid and lashed together and appropriately tied-down by the steel straps 1303 in stacked relation upon the floor 1302 of the pallet 1300. Of course, the pallet 1300 comprises the underframe structure 1304 of the character previously described; whereby it may be readily rolled along the auxiliary track provided on the top of the center sill 41 of the railway car 40C and so that it may be readily connected to the associated mechanism 46 for the tie-down and shock-absorbing functions, as being previously described.

Referring now to FIG. 30, there is shown in fragmentary form the arrangement that is employed in the present transportation system for securing in place the highway semi-trailer 1200 with respect to the center sill 41 of the railway car 40B; which arrangement is disclosed in the previously-mentioned application of Deodat Ciejan, Serial No. 593,848, filed June 26, 1956, now Patent No. 2,944,492. More particularly, the road semi-trailer 1200, as illustrated in FIGS. 28 and 30, is of the tandem rear axle type, including a rear rear axle 1201 and a front rear axle 1202 each carrying suitable road wheels, as well as a front end landing gear or dolly mechanism 1203. The rear rear axle 1201 is provided with dolly mechanism 1211 and the front rear axle 1202 is provided with dolly mechanism 1212; which mechanisms 1211 and 1212 are adapted to cooperate with the auxiliary track provided on the top of the center sill 41. Also, the front end dolly mechanism 1203 in its extended position illustrated is adapted to cooperate with the auxiliary track provided on the top of the center sill 41. Of course, it will be understood that the railway car 40B is adapted to carry two of the highway semi-trailers 1200 and that the highway semi-trailers 1200 are readily placed and removed with respect to the railway car 40B in the manner particularly disclosed in the above-mentioned copending Clejan application, Serial No. 593,848, now Patent No. 2,944,492.

Also the dolly mechanism 1212 that is carried by the front rear axle 1202 is employed for the tie-down purpose in that it cooperates directly with the tie-down shock-absorber mechanism 46 carried by the center sill 41 of the railway car 40B; and specifically, the dolly mechanism 1212 receives the hooks 50 in their extended or operated positions, as shown in FIG. 30, thereby operatively to connect the front rear axle 1202 to the mechanism 46, so as to effect the tie-down and shock-absorbing functions between the highway semi-trailer 1200 and the center sill 31 of the railway car 40B. The particular construction and arrangement of the dolly mechanism 1212 is not described in detail, since it does not comprise any part of the present invention.

By way of recapitulation and in view of the illustrations of FIGS. 27, 28 and 29, it will be readily understood that a large variety of the freight containers 1100A, etc., the freight carriers 1300, etc., and the road semi-trailers 1200, etc., may be readily carried by and operatively connected to a train of railway cars 40A, 40B, 40C, etc. The construction and arrangement of the freight carriers or containers, as disclosed in FIGS. 4, 7, 8 and 10 to 27, inclusive, are disclosed and claimed in the copending divisional application of Deodat Clejan, Serial No. 55,064, filed September 9, 1960.

In view of the foregoing, it is apparent that there has been provided a composite freight transportation system that includes a variety of different transportation vehicles (railway cars, highway semi-trailers, ships, etc.) and freight carriers, freight containers, etc., that may be readily transferred from one to another of the vehicles for transportation purposes and suitably secured in place upon the particular supporting vehicle; whereby a cargo arranged in one of the freight containers may be readily transported via a series of the vehicles, as required, in the shipment of the cargo from the consignor to the consignee; all without opening of the freight container and without handling of the cargo.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A freight transportation unit comprising, a vehicle including a longitudinally extending narrow rigid frame, the upper side edges of said frame constituting rails providing a laterally extending track on the top side thereof, a freight carrier including a longitudinally extending rigid frame provided with a narrow substantially centrally disposed and longitudinally extending saddle in the bottom thereof, said saddle having a width only somewhat greater than that of said vehicle frame between the upper side edges thereof and adapted to straddle laterally the same with the bottom of said saddle supported on the tops of said upper side edges so as to mount said freight carrier frame upon said track on the top of said vehicle frame, said saddle straddling laterally the tops of said upper side edges accommodating guided longitudinal movements of said freight carrier frame upon the top of said vehicle frame incident to placement and to removal of said freight carrier frame with respect to said vehicle frame, and mechanism carried by said vehicle frame and selectively operative between active and inactive positions with respect to said freight carrier frame when it is mounted upon the top of said vehicle frame, said mechanism in its active position engaging said freight carrier frame so as to hold it in place in its mounted position upon the top of said vehicle frame and in its inactive position disengaging said freight carrier frame so as to release it in order to accommodate the removal thereof from said vehicle frame.

2. A freight transportation unit comprising, a vehicle including a longitudinally extending narrow rigid frame, the upper side edges of said frame constituting rails providing a longitudinally extending track on the top side thereof, a freight carrier including a longitudinally extending rigid frame provided with a narrow substantially centrally disposed and longitudinally extending saddle in the bottom thereof, rollers carried by said freight carrier frame and depending from the bottom thereof and disposed within said saddle and engaging said track so as to mount said freight carrier frame upon the top of said vehicle frame, said rollers accommodating guided longitudinal rolling movements of said freight carrier frame upon the top of said vehicle frame incident to placement and to removal of said freight carrier frame with respect to said vehicle frame, said freight carrier frame being substantially wider than said vehicle frame so that the outer side portions of said freight carrier frame disposed laterally on opposite sides of said saddle project outwardly beyond the opposite sides of said vehicle frame, said saddle having a width that is only somewhat greater than that of said vehicle frame and a depth that is only somewhat greater than the downward projection of said rollers so that the outer side portions of said freight carrier frame disposed laterally on opposite sides of said saddle depend below the top of said track in order to effect a low center of gravity of said freight carrier when said freight carrier is mounted on top of said vehicle frame, and mechanism carried by said vehicle frame and selectively operative between active and inactive positions with respect to said freight carrier frame when it is mounted upon the top of said vehicle frame, said mechanism in its active position engaging said freight carrier frame so as to hold it in place in its mounted position upon the top of said vehicle frame and in its inactive position disengaging said freight carrier frame so as to release it in order to accommodate the removal thereof from said vehicle frame.

3. A freight transportation unit comprising, a highway vehicle including a longitudinally extending narrow rigid frame supported by highway running gear, the upper side edges of said frame constituting rails providing a longitudinally extending track at the top side thereof, a freight carrier including a longitudinally extending rigid frame provided with a narrow substantially centrally disposed and longitudinally extending saddle in the bottom thereof, rollers carried by said freight carrier frame and depending from the bottom thereof and disposed within said saddle and engaging said track so as to mount said freight carrier frame upon the top of said highway vehicle frame, said rollers accommodating guided longitudinal rolling movements of said freight carrier frame upon the top of said highway vehicle frame incident to placement and to removal of said freight carrier frame with respect to said highway vehicle frame, said freight carrier frame being substantially wider than said highway vehicle frame so that the outer side portions of said freight carrier frame disposed laterally on opposite sides of said saddle project outwardly beyond the opposite sides of said highway vehicle frame, said saddle having a width that is only somewhat greater than that of said highway vehicle frame and a depth that is only somewhat greater than the downward projection of said rollers so that the outer side portions of said freight carrier frame disposed laterally on opposite sides of said saddle depend below the top of said track in order to effect a low center of gravity of said freight carrier when said freight carrier is mounted on top of said highway vehicle frame, and mechanism carried by said highway vehicle frame and selectively operative between active and inactive positions with respect to said freight carrier frame when it is mounted upon the top of said highway vehicle frame, said mechanism in its active position engaging said freight carrier frame so as to hold it in place in its mounted position upon the top of said highway vehicle frame and in its inactive position disengaging said freight carrier frame so as to release it in order to accommodate the removal thereof from said highway vehicle frame.

4. A freight transportation unit comprising a railway car including an elongated center sill supported at the opposite ends thereof by a pair of trucks each carrying main track wheels, said center sill being located between the planes of the inner sides of said main track wheels, the upper edges of said center sill constituting rails providing an elongated auxiliary track on the top of said center sill, a freight carrier including a longitudinally extending rigid frame provided with a narrow substantially centrally disposed and longitudinally extending saddle in the bottom thereof, rollers carried by said freight carrier frame and depending from the bottom thereof and disposed within said saddle and engaging said track so as to mount said freight carrier frame upon the top of said center sill, said rollers accommodating guided longitudinal rolling movements of said freight carrier frame upon the top of said center sill incident to placement and to removal of said freight carrier frame with respect to said center sill, said freight carrier frame being substantially wider than said center sill so that the outer side portions of said freight carrier frame disposed laterally on opposite sides of said saddle project outwardly beyond the opposite sides of said center sill, said saddle having a width that is only somewhat greater than that of said center sill and a depth that is only somewhat greater than the downward projection of said rollers so that the outer side portions of said freight carrier frame disposed laterally on opposite sides of said saddle depend below the top of said track in order to effect a low center of gravity of said freight carrier when said freight carrier is mounted on top of said center sill, and mechanism carried by said center sill and selectively operative between active and inactive positions with respect to said freight carrier frame when it is mounted upon the top of said center sill, said mechanism in its active position engaging said freight carrier frame so as to hold it in place in its mounted position upon the top of said center sill and in its inactive position disengaging said freight carrier frame so as to release it in order to accommodate the removal thereof from said center sill.

References Cited in the file of this patent

UNITED STATES PATENTS

| | | |
|---|---|---|
| 1,883,538 | Bywater | Oct. 18, 1932 |
| 2,099,288 | Allen | Nov. 16, 1937 |
| 2,147,130 | Sisson | Feb. 14, 1939 |
| 2,223,275 | Valenzuela | Nov. 26, 1940 |
| 2,229,547 | Bonsall | Jan. 21, 1941 |
| 2,613,836 | Newhall et al. | Oct. 14, 1952 |
| 2,620,079 | Rosenbaum | Dec. 2, 1952 |
| 2,645,185 | Fields | July 14, 1953 |
| 2,715,971 | Cox | Aug. 23, 1955 |
| 2,761,581 | Cohee | Sept. 4, 1956 |
| 2,845,878 | Gutridge | Aug. 5, 1958 |
| 2,864,321 | Clejan | Dec. 16, 1958 |
| 2,932,258 | Marquard | Apr. 12, 1960 |
| 2,949,865 | De Grandpre | Aug. 23, 1960 |
| 2,984,084 | Talmey et al. | May 16, 1961 |
| 2,987,013 | Rosenbaum | June 6, 1961 |

FOREIGN PATENTS

| | | |
|---|---|---|
| 1,114,202 | France | Dec. 12, 1955 |